US007643172B2

(12) United States Patent
Tomita

(10) Patent No.: US 7,643,172 B2
(45) Date of Patent: Jan. 5, 2010

(54) INFORMATION PROCESSING APPARATUS, CONTROL METHOD THEREOF, AND PROGRAM

(75) Inventor: Makoto Tomita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 11/463,661

(22) Filed: Aug. 10, 2006

(65) Prior Publication Data

US 2007/0035770 A1 Feb. 15, 2007

(30) Foreign Application Priority Data

Aug. 15, 2005 (JP) ............................ 2005-235495

(51) Int. Cl.
*G06K 15/00* (2006.01)
*G06F 3/12* (2006.01)

(52) U.S. Cl. ..................... 358/1.18; 358/1.14; 358/1.15

(58) Field of Classification Search ................ 358/1.18, 358/1.1, 1.15, 1.14, 1.13, 476, 1.12, 1.11, 358/1.2, 1.5, 1.6, 1.9; 715/204, 243, 246, 715/274; 347/2, 3, 5, 14, 23; 399/1, 2, 361, 399/362, 407, 394, 387, 372
See application file for complete search history.

(56) References Cited

U.S. PATENT DOCUMENTS 5,735,659 A * 4/1998 Kosasa et al. .................. 412/9
5,832,193 A * 11/1998 Perine et al. ............... 358/1.18
2004/0098665 A1 * 5/2004 Kasahara et al. ............ 715/500

FOREIGN PATENT DOCUMENTS

JP 2004-155152 6/2004

* cited by examiner

*Primary Examiner*—Dov Popovici
(74) *Attorney, Agent, or Firm*—Cowan, Liebowitz & Latman, P.C.

(57) ABSTRACT

A position serving as the print position where an object for a backstrip is printed on a backstrip of a cover is set. A reference position in the manuscript page data for the cover is also set. A decision of the print position where the manuscript page data is printed on the print sheet for the cover is decided so as to make the set position serving as the print position and the reference position coincide with each other.

2 Claims, 33 Drawing Sheets

FIG. 4A

| NO. | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | SHEET SIZE | MANUSCRIPT SIZE / FIXED SIZE | • Z-FOLD IS DESIGNATED WHEN "A4+A3", "B4+B3", OR "LETTER+LEDGER (11×17)" IS DESIGNATED<br>• MANUSCRIPT SIZE OF FIRST CHAPTER / PAGE IS AUTOMATICALLY SELECTED WHEN BOOKBINDING PRINTING OR N-up PRINTING IS DESIGNATED |
| 3 | SHEET ORIENTATION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BORDER LINE / LAYOUT POSITION, ETC | • LAYOUT POSITION : NINE PATTERNS<br>• X1 PRINTING CAN BE DESIGNATED |
| 6 | ENLARGEMENT / REDUCTION | ON / OFF | • ON / OFF CAN BE AUTOMATICALLY DESIGNATED WHEN SHEET SIZE IS FIXED SIZE OR N-up PRINTING IS SELECTED |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | | |
|---|---|---|---|
| 8 | HEADER / FOOTER | | • HEADER / FOOTER CAN BE DESIGNATED INDIVIDUALLY IN LOGICAL OR PHYSICAL PAGES<br>• ALL CHAPTERS / PAGES ARE TARGETED |
| 9 | DELIVERY METHOD | STAPLING / PUNCH HOLE | • STAPLING / PUNCHING ONLY IN SINGLE- / DOUBLE-SIDED PRINTING<br>• STAPLING AT ONE / TWO PORTIONS |
| 10 | DETAILS OF BOOKBINDING | OPENING DIRECTION / SADDLE STITCH / ENLARGEMENT & REDUCTION DESIGNATION / BINDING MARGIN / FASCICLE DESIGNATION, ETC | • ONLY IN BOOKBINDING PRINTING |
| 11 | FRONT COVER / BACK COVER / BACKSTRIP | | • PRINTING IS DESIGNATED FOR 1 / 2 FRONT COVER, 1 / 2 BACK COVER, OR BACKSTRIP<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING PRINTING CANNOT BE DESIGNATED |
| 13 | INSERTING SHEET | | • FEED PORT (INCLUDING INSERTER) IS DESIGNATED<br>• MANUSCRIPT DATA CAN BE PRINTED ON INSERTING SHEET<br>• BOOKBINDING PRINTING CANNOT BE DESIGNATED |
| 14 | CHAPTER SEGMENTATION | "NONE" / "PAGE BREAK" / "SHEET CHANGE" | • "SHEET CHANGE" IS FIXED WHEN INDEX SHEET OR INSERTING SHEET IS DESIGNATED<br>• "SHEET CHANGE" IN SINGLE-SIDED PRINTING |

FIG. 5

| NO. | ATTRIBUTE INFORMATION | | REMARKS |
|---|---|---|---|
| 1 | SHEET SIZE | MANUSCRIPT SIZE / FIXED SIZE | • "SHEET CHANGE" IS AUTOMATICALLY DESIGNATED WHEN FIXED SIZE IS SELECTED<br>• WHEN A PLURALITY OF SHEETS ARE SELECTED BY BOOK, SHEET SIZE CAN BE CHANGED TO ONLY DESIGNATED SHEET. SHEET SIZE CAN BE CHANGED EVEN WITH DESIGNATION COMPLYING WITH BOOK |
| 2 | SHEET ORIENTATION | PORTRAIT / LANDSCAPE | • SELECTABLE ONLY FOR FIXED SIZE |
| 3 | N-up PRINTING DESIGNATION | NUMBER OF PAGES / LAYOUT ORDER / BORDER LINE / LAYOUT POSITION, ETC | • LAYOUT POSITION : NINE PATTERNS<br>• X1 PRINTING CAN BE DESIGNATED |
| 4 | ENLARGEMENT / REDUCTION | ON / OFF | • ON / OFF CAN BE AUTOMATICALLY DESIGNATED WHEN SHEET SIZE IS FIXED SIZE OR N-up PRINTING IS SELECTED |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DELIVERY METHOD | STAPLING | • STAPLING CAN BE SET OFF WHEN STAPLING IS DESIGNATED BY BOOK. DEFAULT VALUE IS "ON" |

FIG. 6

| NO. | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS / FOOTERS DESIGNATED BY BOOK IS DESIGNATED |
| 4 | ZOOM | 50% - 200% | • SCALING RATIO RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS, ARBITRARY POSITION IS DESIGNATED |
| 6 | ANNOTATION | | |
| 7 | VARIABLE ITEM | | |
| 8 | PAGE SEPARATION | | |

INFORMATION PROCESSING APPARATUS, CONTROL METHOD THEREOF, AND PROGRAM

BACKGROUND OF THE INVENTION

1. Field of the Invention

The present invention relates to an information processing apparatus which calculates the print position of manuscript page data to be printed on a print sheet, a control method thereof, and a program.

2. Description of the Related Art

There is known a bookbinding system which performs bookbinding printing using document data created by an application program. The bookbinding system instructs a printing device to print document data and a cover manuscript serving as a cover. Some bookbinding systems perform various in-line bookbinding processes such as gluing and cutting for the printed manuscript document and its cover manuscript.

For example, Japanese Patent Laid-Open No. 2004-155152 proposes a bookbinding system which implements case binding by controlling the print position to shift document data to be printed to the left, center, or right in the widthwise direction of the backstrip in consideration of the backstrip width in printing a case binding cover.

In the prior art, however, before case binding is executed, the user must register backstrip data in advance in consideration of the backstrip width corresponding to the sheet type and the number of sheets. In entering manuscript data, a user having no expert knowledge often enters cover data with a backstrip of a proper size. In many cases, the user is not so conscious of data to be printed on the backstrip.

In most recent printed materials, the front cover and backstrip are colored in a series of background colors, and only the back cover is colored in a different background color. In contrast, the back cover and backstrip are colored in a series of background colors, and only the front cover is colored in a different background color. In this case, it is desired to divide a cover sheet into parts of different print colors. For example, in the former case, a cover sheet is folded at the boundary between the backstrip and the back cover by the bookbinding apparatus. In the latter case, a cover sheet is folded at the boundary between the backstrip and the front cover by the bookbinding apparatus.

The folding position is important. However, the device rarely aligns the folding position by the bookbinding unit of an image forming apparatus, unlike Japanese Patent Laid-Open No. 2004-155152. Alignment of the folding position complicates the arrangement, and increases the product cost of the bookbinding apparatus for the image forming apparatus. Hence, most conventional bookbinding units fold a cover by aligning a cover sheet at the center reference of the image forming position.

For example, when the folding position of the bookbinding apparatus is fixed at the center of a sheet, the backstrip corresponds to the center of a print sheet. When the print color changes between the front cover and the backstrip or between the backstrip and the back cover, manuscript data must be prepared in advance in correspondence with the backstrip width, similar to the prior art, increasing the burden on the user.

Japanese Patent Laid-Open No. 2004-155152 does not consider the design of a print manuscript in a layout application (also called an imposition application) in a host computer before print data is sent to the image forming apparatus. In Japanese Patent Laid-Open No. 2004-155152, the image forming apparatus is configured to simply print a front cover part, backstrip part, and back cover part at corresponding positions.

For this reason, even when no strict design is required, the operator must manually adjust the print position of a manuscript in consideration of the backstrip width and the folding position of a sheet serving as the backstrip. In addition, a cover manuscript must be created in consideration of the backstrip width, and the design of a manuscript is limited even when no strict design is required.

In the layout application, if the sheet used for printing is changed or a manuscript is added or deleted after a backstrip manuscript is determined, problems occur such that the backstrip manuscript width becomes short, the backstrip manuscript extends over the width, and its position shifts.

SUMMARY OF THE INVENTION

The present invention has been made to overcome the conventional drawbacks, and has its object to provide an information processing apparatus capable of efficiently, easily setting and adjusting the print position of a manuscript subjected to bookbinding printing, a control method thereof, and a program.

According to the present invention, the foregoing object is attained by providing an information processing apparatus which calculates a print position of manuscript page data for a cover that is to be printed on a print sheet for the cover, comprising:

setting means for setting a backstrip alignment position representing an alignment position of a backstrip in the manuscript page data with respect to a folding position of the print sheet; and calculation means for calculating, on the basis of the backstrip alignment position set by the setting means, a print position where the manuscript page data is printed on the print sheet.

In a preferred embodiment, the apparatus further comprises storage means for storing document information on the manuscript page data, wherein the calculation means calculates the print position where the manuscript page data is printed on the print sheet, on the basis of width information of the backstrip and width information of the print sheet that are obtained from the document information in the storage means, and the backstrip alignment position set by the setting means.

In a preferred embodiment, the setting means has a center of the backstrip, a first end serving as one end of the backstrip, and a second end serving as the other end of the backstrip, which are can be selected as choices of the backstrip alignment position.

In a preferred embodiment, the setting means further comprises position designation means for designating a reference position serving as a reference in the manuscript page data, and the calculation means calculates the print position where the manuscript page data is printed on the print sheet so as to make the backstrip alignment position and the reference position coincide with each other.

In a preferred embodiment, the setting means further comprises backstrip range designation means for designating a backstrip range in the manuscript page data, and when the backstrip range designation means designates the backstrip range, the calculation means calculates the print position where the manuscript page data is printed on the print sheet, on the basis of two end positions of the backstrip range and the backstrip alignment position set by the setting means.

In a preferred embodiment, the setting means further comprises division means for, when the backstrip range designation means designates the backstrip range, dividing the manuscript page data in accordance with the backstrip range, and the calculation means calculates the print position where the manuscript page data is printed on the print sheet, on the basis of a front cover part, backstrip part, and back cover part of the manuscript page data that are obtained by the division means.

In a preferred embodiment, the setting means further comprises instruction means for validating designation by the backstrip range designation means.

In a preferred embodiment, the setting means further comprises concatenation means for combining and concatenating arbitrary data among manuscript page data containing at least one of a front cover, a backstrip, and a back cover to generate manuscript page data having a series of the front cover, the backstrip, and the back cover.

In a preferred embodiment, the position designation means sets the reference position in an initial state on the basis of the backstrip alignment position and text information regarding the manuscript page data.

In a preferred embodiment, the backstrip range designation means designates the backstrip range in an initial state on the basis of the backstrip alignment position and text information regarding the manuscript page data.

In a preferred embodiment, the setting means further comprises backstrip range designation means for designating a backstrip range in the manuscript page data, the calculation means further comprises scaling means for, when a virtual backstrip range designated by the backstrip range designation means is different from an actual backstrip range obtained from text information regarding the manuscript page data, scaling a backstrip part of the virtual backstrip range so as to fit in the actual backstrip range, and the calculation means calculates the print position where the manuscript page data is printed on the print sheet, on the basis of the backstrip part scaled by the scaling means and the backstrip alignment position set by the setting means.

In a preferred embodiment, the setting means further comprises backstrip range designation means for designating a backstrip range in the manuscript page data, the calculation means further comprises painting means for, when a virtual backstrip range designated by the backstrip range designation means is different from an actual backstrip range obtained from text information regarding the manuscript page data, painting a margin between the virtual backstrip range and the actual backstrip range in a predetermined color, and the calculation means calculates the print position where the manuscript page data is printed on the print sheet, on the basis of the backstrip part of the virtual backstrip range, the margin painted by the painting means, and the backstrip alignment position set by the setting means.

In a preferred embodiment, the apparatus further comprises output means for, when a difference between the print position calculated by the calculation means and a print position obtained from document information on the manuscript page data is not less than a predetermined value, outputting warning information announcing that the difference is not less than the predetermined value.

In a preferred embodiment, the calculation means further comprises backstrip width calculation means for calculating backstrip width information in the manuscript page data on the basis of the number of sheets of a body, a sheet for use, and sheet thickness information of the body that are obtained from document information on the manuscript page data, and the calculation means calculates the print position where the manuscript page data is printed on the print sheet, on the basis of the backstrip width information calculated by the backstrip width calculation means and the backstrip alignment position set by the setting means.

In a preferred embodiment, the backstrip width calculation means calculates again the backstrip width information on the basis of a change of the document information.

According to the present invention, the foregoing object attained by providing a method of controlling an information processing apparatus which calculates a print position of manuscript page data for a cover that is to be printed on a print sheet for the cover, comprising:

a setting step of setting a backstrip alignment position representing an alignment print position of a backstrip in the manuscript page data with respect to a folding position of the print sheet; and a calculation step of calculating, on the basis of the backstrip alignment position set in the setting step, a print position where the manuscript page data is printed on the print sheet.

According to the present invention, the foregoing object is attained by providing a program for causing a computer to control an information processing apparatus which calculates a print position of manuscript page data for a cover that is to be printed on a print sheet for the cover, characterized by causing the computer to execute a setting step of setting a backstrip alignment position representing an alignment print position of a backstrip in the manuscript page data with respect to a folding position of the print sheet, and a calculation step of calculating, on the basis of the backstrip alignment position set in the setting step, a print position where the manuscript page data is printed on the print sheet.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A and 4B are tables showing an example of book attributes (document setting information) according to the embodiment of the present invention;

FIG. 5 is a table showing an example of chapter attributes (chapter setting information) according to the embodiment of the present invention;

FIG. 6 is a table showing an example of page attributes (page setting information) according to the embodiment of the present invention;

DESCRIPTION OF THE EMBODIMENT

A preferred embodiment of the present invention will be described in detail in accordance with the accompanying drawings.

The following embodiment is related to an information processing technique of providing editing and designation functions associated with the print position of a manuscript including a backstrip and a manuscript adjustment process when bookbinding printing is done using document data. The following embodiment is particularly related to an information processing/document processing technique in a system comprised of an information processing apparatus and printer.

[Outline of Document Processing System]

In a document processing system according to the embodiment of the present invention, a data file created by a general application is converted into an electronic manuscript file by an electronic manuscript writer. A bookbinding application provides a function of editing the electronic manuscript file.

In the embodiment, functions such as a general application, electronic manuscript writer, bookbinding application, and electronic manuscript de-spooler are separately described for distinction between these functions implemented by a document processing system. However, a package provided to the user is not limited to these functions. For example, these functions may be provided as an application or graphic engine formed from a combination of them.

<Example of Software Configuration of Document Processing System>

Figure 1A:
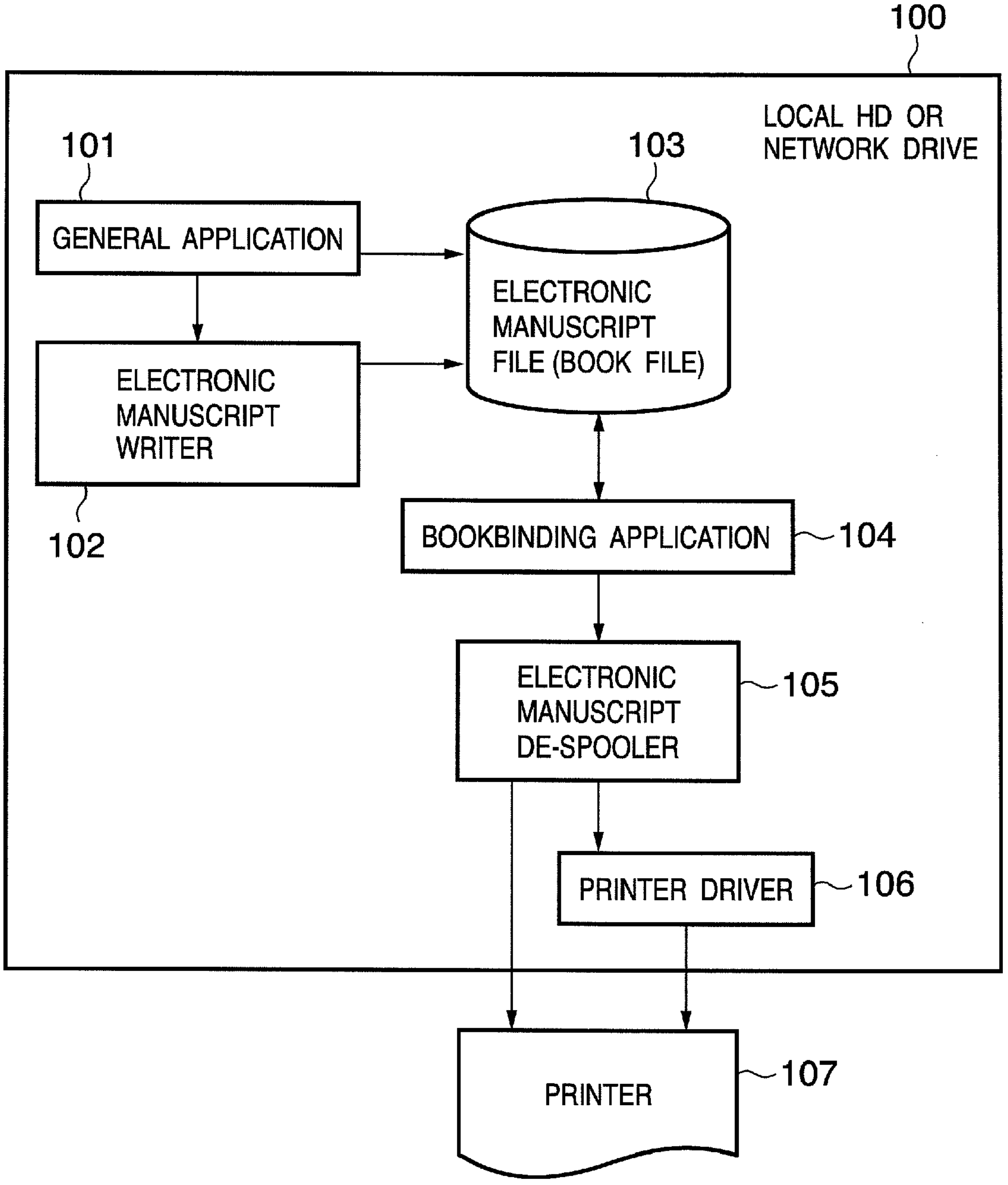
FIG. 1A is a block diagram showing the software configuration of a document processing system according to an embodiment of the present invention.

FIG. 1A is a block diagram showing the software configuration of the document processing system according to the embodiment of the present invention.

The document processing system is implemented by a computer 100 (to be also referred to as a host computer hereafter) as a preferred embodiment of a document processing apparatus (information processing apparatus) of the present invention.

A general application 101 is an application program which provides various functions such as wordprocessing, spreadsheet, photo-retouch, draw, paint, presentation, and text editing. The general application 101 has a print function compatible with an OS (Operating System) running on the computer 100. The general application 101 uses a predetermined interface (generally called a GDI) provided by the OS in printing created application data such as document data or image data.

To print created data, the general application 101 transmits an output command (called a GDI function) of a predetermined OS-dependent format to the output module (not shown) of the OS providing the predetermined interface. Upon reception of the output command, the output module converts the output command into a format processible by an output device such as a printer, and outputs the converted command (called a DDI function).

Since the format processible by an output device changes depending on the device type, manufacturer, model, or the like, a device driver for controlling the device is provided for each device. The OS converts a command using the device driver to generate print data, and combines the print data by JL (Job Language) to generate a print job. When the OS is Microsoft Windows, the output module is a GDI (Graphic Device Interface) module.

An electronic manuscript writer 102 is an improvement of the above-mentioned device drivers, and is a software module provided to implement the document processing system. The electronic manuscript writer 102 does not target a specific output device, and converts an output command into a format processible by a bookbinding application 104 or printer driver 106 (to be described later). The format (to be referred to as an "electronic manuscript format" hereinafter) converted by the electronic manuscript writer 102 is not particularly limited as far as each manuscript page can be expressed by a detailed format. Practical standard formats are, for example, the PDF format by Adobe Systems and the SVG format.

When the general application 101 utilizes the electronic manuscript writer 102, the electronic manuscript writer 102 is designated as a device driver used for output, and then caused to print. An electronic manuscript file created by the electronic manuscript writer 102 does not have a complete electronic manuscript file format.

For this reason, the electronic manuscript writer 102 is designated as a device driver by the bookbinding application 104, and converts application data into an electronic manuscript file under the management of the bookbinding application 104. The bookbinding application 104 completes a new incomplete electronic manuscript file generated by the electronic manuscript writer 102 as an electronic manuscript file having the following format.

In case of necessity to definitely discriminate these files, a file created by the electronic manuscript writer 102 will be called an electronic manuscript file, and an electronic manuscript file given a structure by the bookbinding application 104 will be called a book file. If these files need not be particularly discriminated, a document file generated by an application, an electronic manuscript file, and a book file are called document files (or document data).

As described above, the electronic manuscript writer 102 is designated as a device driver, and the general application 101 prints the data. Application data is converted into an electronic manuscript format in pages (to be referred to as "logical pages" or "manuscript pages" hereinafter) defined by the general application 101. The application data of the electronic manuscript format is stored as an electronic manuscript file 103 in a storage medium such as a hard disk.

The hard disk may be a local drive of a computer which implements the document processing system according to the embodiment, or a drive provided on a network when the document processing system is connected to the network.

When the general application 101 itself has an ability to create data of the electronic manuscript format, it is not necessary to designate the electronic manuscript writer 102 and print. In this case, data of the electronic manuscript format generated by the general application 101 itself can also be converted from application data into an electronic manuscript file under the control of the bookbinding application 104.

The bookbinding application 104 provides the user with a function of reading and editing the electronic manuscript file or book file 103. The bookbinding application 104 does not provide a function of editing the contents of each page, and provides a function of editing a chapter or book structure (to be described later) made up of pages as a minimum unit.

To print the book file 103 edited by the bookbinding application 104, the bookbinding application 104 activates an electronic manuscript de-spooler 105. The electronic manuscript de-spooler 105 is a program module which is installed in the computer together with the bookbinding application 104. The electronic manuscript de-spooler 105 is a module used to output drawing data to the printer driver 106 in printing a document (book file) used by the bookbinding application 104.

The electronic manuscript de-spooler 105 reads out the designated book file 103 from the hard disk. To print each page in a format described in the book file 103, the electronic manuscript de-spooler 105 generates an output command complying with the output module of the OS, and outputs the command to the output module. At this time, the printer driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the device command on a print sheet.

When the printer 107 can directly interpret the electronic manuscript format, the electronic manuscript de-spooler 105 transmits the electronic manuscript format and a print instruction to the printer 107. The electronic manuscript de-spooler 105 reads out the designated book file 103 from the hard disk. To print each page in a format described in the book file 103, the electronic manuscript de-spooler 105 generates a device command complying with the printer 107, and outputs the command to the output module. The output module transmits the device command to the printer 107, which prints an image corresponding to the device command on a print sheet.

<Example of Hardware Configuration of Document Processing System>

Figure 1B:
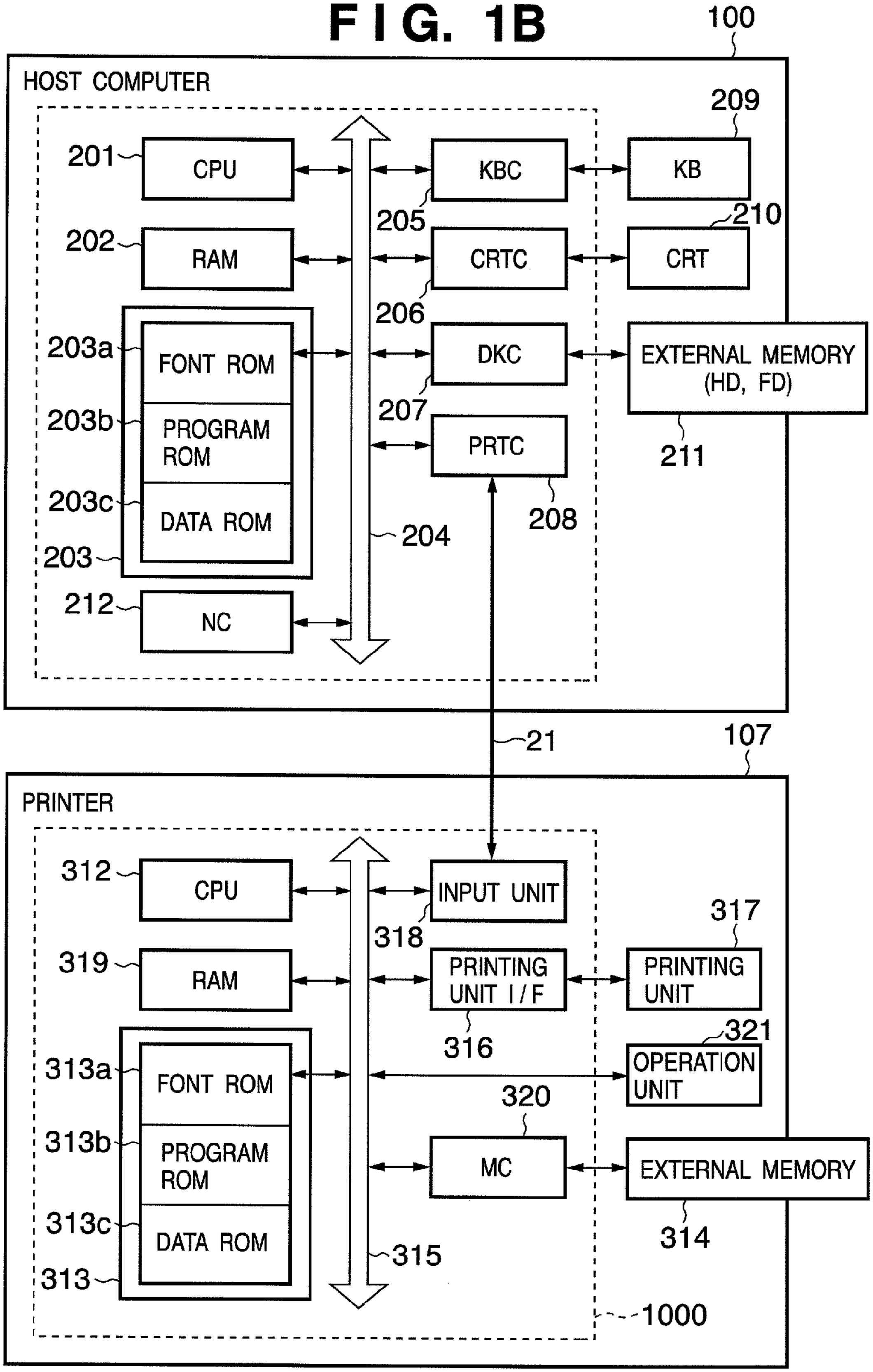
FIG. 1B is a block diagram showing the hardware configuration of the document processing system according to the embodiment of the present invention.

FIG. 1B is a block diagram showing the hardware configuration of the document processing system according to the embodiment of the present invention.

In FIG. 1B, reference numeral 100 denotes a host computer having a CPU 201. The CPU 201 executes processes based on a program such as a document process program (application program) or a print process-related program that is stored in a program ROM 203*b* of a ROM 203 or an external memory 211. The processes include a document process for a mixture of building elements such as a figure, image, text, and table (including a spreadsheet and the like). The CPU 201 comprehensively controls devices connected to a system device 204 in the host computer 100.

The program ROM 203*b* of the ROM 203 or the external memory 211 also stores programs such as a BIOS and an operating system program (to be referred to as an OS hereinafter) serving as the control program of the CPU 201. A font ROM 203*a* of the ROM 203 or the external memory 211 stores data such as font data used in a document process. A data ROM 203*c* of the ROM 203 or the external memory 211 stores various data used to perform various processes such as a document process.

Reference numeral 202 denotes a RAM which functions as a main memory, work area, or the like for the CPU 201. Reference numeral 205 denotes a keyboard controller (KBC) which controls a key input from a keyboard (KB) 209 or a command input from a pointing device (not shown). Reference numeral 206 denotes a CRT controller (CRTC) which controls display of a CRT display (CRT) 210. Instead of the CRT controller 206 and CRT display 210, an LCD controller and LCD may also be adopted.

Reference numeral 207 denotes a disk controller (DKC) which controls access to the external memory 211 such as a hard disk (HD) or floppy® disk (FD). The external memory 211 stores various data such as a boot program, various applications, font data, user files, edited files, and a print control command generation program (to be referred to as a printer driver hereinafter).

Reference numeral 208 denotes a printer controller (PRTC) which is connected to the printer 107 via a predetermined bidirectional interface (interface) 21, and executes a communication control process with the printer 107. Examples of the bidirectional interface are a USB interface, IEEE1394 interface, and wireless LAN interface.

The CPU 201 executes, e.g., an outline font expansion (rasterization) process to a display information RAM set in the RAM 202, thereby providing a GUI and enabling WYSIWYG on the CRT 210. The CPU 201 opens various registered windows and executes various data processes on the basis of commands designated with a mouse cursor (not shown) or the like on the CRT 210. When the user executes printing, he opens a window (operation window) concerning print settings, and can perform setting of a printer and setting of a printing method to the printer driver, including selection of a print mode.

In the printer (printing apparatus) 107, reference numeral 312 denotes a printer CPU. The printer CPU 312 comprehensively controls devices connected to a system bus 315 in a printer control unit 1000. The printer CPU 312 outputs an image signal as output information to a printing unit (printer engine) 317 via a printing unit interface (I/F) 316. This output is based on a program such as a control program stored in a program ROM 313*b* of a ROM 313 or an external memory 314.

The program ROM 313*b* of the ROM 313 stores a program such as the control program of the printer CPU 312. A font ROM 313*a* of the ROM 313 stores data such as font data used to generate the output information. For a printer having no external memory 314 such as a hard disk (HD) or IC card, a data ROM 313*c* of the ROM 313 stores information and the like used in the host computer 100.

The printer CPU 312 can communicate with the host computer 100 via an input unit 318, and notify the host computer 100 of various types of information such as status information in the printer 107. Reference numeral 319 denotes a RAM which functions as a main memory, work area, or the like for the printer CPU 312. The RAM 319 can expand its memory capacity by an optional RAM connected to an expansion port (not shown).

The RAM 319 is used as an output information expansion area, environment data storage area, NVRAM, or the like. Access to the external memory 314 is controlled by a memory controller (MC) 320. The external memory 314 is connected as an option, and stores data such as font data, emulation programs, and form data. Reference numeral 321 denotes an operation unit which is equipped with an operation panel, switches, LED display, and the like for implementing various operations for the printer 107.

The number of external memories 314 is not limited to one. The printer control unit 1000 may also be configured to have at least one external memory 314 and connect a plurality of external memories which store an option font card and a program for interpreting the printer control languages of different language systems in addition to built-in fonts. Further, the printer control unit 1000 may comprise an NVRAM (not shown) and store printer mode setting information from the operation unit 321.

The structure of a copying apparatus applicable as the printer 107 in FIG. 1B will be explained with reference to FIG. 1C.

Figure 1C:
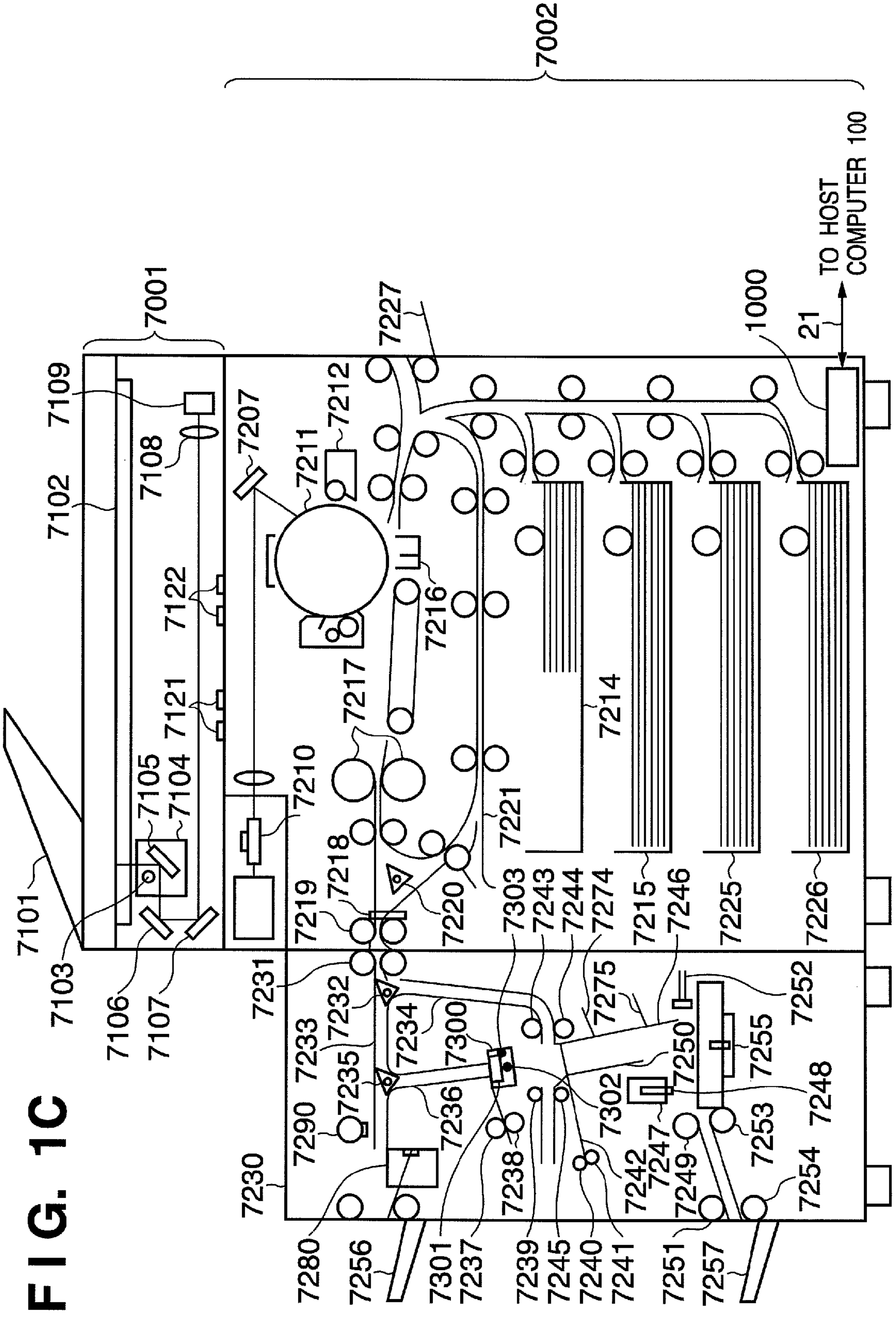
FIG. 1C is a sectional view showing the structure of a copying apparatus applicable as a printer according to the embodiment of the present invention.

FIG. 1C is a sectional view showing the structure of the copying apparatus applicable as the printer according to the embodiment of the present invention.

As shown in FIG. 1C, the copying apparatus according to the embodiment is comprised of a reader section 7001, printer section 7002, and bookbinding unit 7230. The structure and operation of the reader section 7001 will be explained. Note that the structure of the printer section 7002 and the structure and operation of the bookbinding unit 7230 will be described later.

In the reader section 7001 shown in FIG. 1C, reference numeral 7101 denotes a manuscript feed device. Manuscript sheets stacked on the manuscript feed device 7101 are conveyed sequentially one by one onto a manuscript table glass surface 7102. After the manuscript is conveyed at a predetermined position on the manuscript table glass surface 7102, a lamp 7103 of the reader section 7001 is turned on, and a scanner unit 7104 moves to irradiate the manuscript. Light reflected by the manuscript is guided to a CCD image sensor unit 7109 (to be referred to as a CCD hereinafter) via mirrors 7105, 7106, and 7107, and a lens 7108.

[Description of Printer Section 7002]

In the printer section 7002 of FIG. 1C, reference numeral 7210 denotes an exposure control unit which converts an image signal input to the printer section 7002 into a modulated optical signal, and irradiates a photosensitive body 7211 via a mirror 7207. A latent image which is formed by the irradiation light on the photosensitive body 7211 is developed by a developing portion 7212. A print sheet is conveyed from one of print sheet stacking portions 7214, 7215, 7225, and 7226 and a manual feed portion 7227 in synchronism with the timing with the leading end of the developed image. The developed image is transferred onto the print sheet at a transfer portion 7216.

The developed image transferred on the print sheet is fixed to the print sheet at fixing portions 7217. Then, the print sheet is guided toward delivery rollers 7219 via a convey direction switching member 7220, passes through a delivery sensor 7218, and is delivered to the bookbinding unit 7230 via the delivery rollers 7219.

After the output sheet on which the image is fixed at the fixing portions 7217 is once conveyed to the delivery rollers 7219, the sheet convey direction is reversed to convey the sheet to a refeed printed-sheet stacking portion 7221 via the convey direction switching member 7220. When the next manuscript is prepared, the manuscript image is read similarly to the above process. In this case, the print sheet is fed from the refeed printed-sheet stacking portion 7221. Two manuscript images can be output on the obverse and reverse of a single output sheet.

The print sheet output from the delivery rollers 7219 is transferred to the bookbinding unit 7230. The bookbinding unit 7230 is a post-processing apparatus capable of executing a glue binding process (case binding process) for printed sheets output from the printer section 7002.

The bookbinding unit 7230 performs a post-process by changing the print sheet traveling direction in accordance with process contents. When the punching function is performed, the bookbinding unit 7230 controls direction switching members 7232 and 7235 to guide a print sheet to a punching unit 7290 in order to punch the print sheet by the punching unit 7290.

Similarly, when the stapling function is performed, the bookbinding unit 7230 controls the direction switching members 7232 and 7235 in order to staple print sheets by a stapling unit 7280. The stapling unit 7280 staples print sheets in accordance with the type of stapling. Print sheets processed by the punching unit 7290 or stapling unit 7280 are delivered onto a delivery tray 7256.

When the glue binding function is performed, the bookbinding unit 7230 controls the direction switching members 7232 and 7235 to guide a print sheet to a gluing unit 7300. Print sheets glued and bound by the gluing unit 7300 are delivered onto a delivery tray 7257.

When no post-process is performed by the punching unit 7290, stapling unit 7280, and gluing unit 7300, a print sheet is delivered onto the delivery tray 7257.

The delivery trays 7256 and 7257 are equipped with sensors (not shown) capable of detecting the stacking amount of delivered print sheets and the like. Based on the detection result of the sensor, a CPU circuit unit 7122 can determine whether a print sheet can be delivered onto the delivery tray.

The functional configuration of the host computer will be explained with reference to FIG. 1D.

Figure 1D:
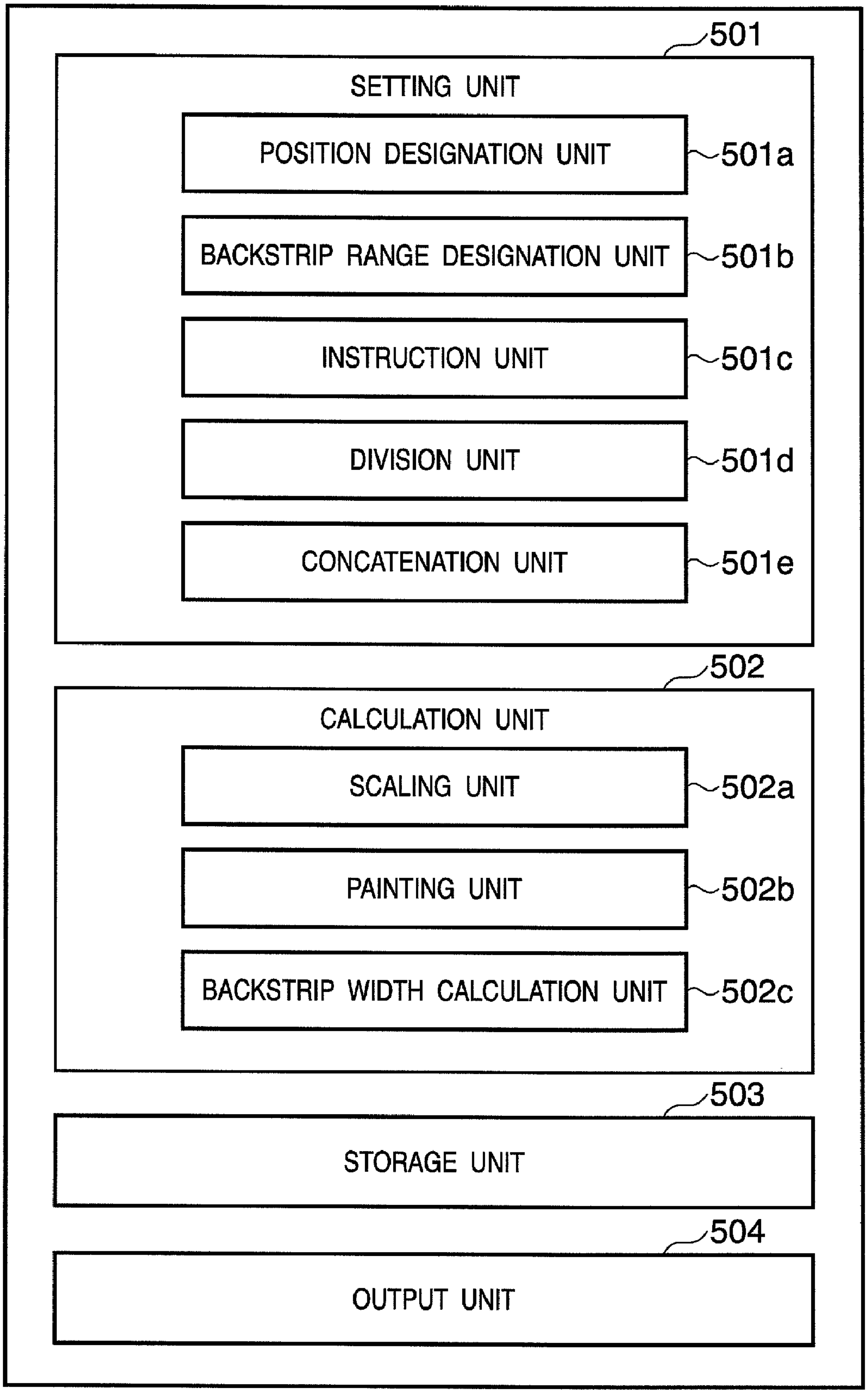
FIG. 1D is a block diagram showing the functional configuration of the document processing system according to the embodiment of the present invention.

FIG. 1D is a block diagram showing the functional configuration of the host computer according to the embodiment of the present invention.

A setting unit 501, calculation unit 502, storage unit 503, and output unit 504 are implemented by various programs such as the bookbinding application 104.

The setting unit 501 sets a backstrip alignment position representing the alignment position of the backstrip in manuscript page data with respect to the folding position of a print sheet. In the setting unit 501, a position designation unit 501*a* designates a reference position serving as a reference in manuscript page data. A backstrip range designation unit 501*b* designates a backstrip range in manuscript page data. An instruction unit 501*c* issues an instruction to enable designation by the backstrip range designation unit 501*b*. When the backstrip range is designated, a division unit 501*d* divides manuscript page data in accordance with the backstrip range. A concatenation unit 501*e* combines and concatenates arbitrary data among manuscript page data including at least one of the front cover, backstrip, and back cover, thereby generating manuscript page data having a series of the front cover, backstrip, and back cover.

The calculation unit 502 calculates, on the basis of the set backstrip alignment position, a print position where manuscript page data is printed on a print sheet. In the calculation unit 502, when a designated virtual backstrip range is different from an actual backstrip range obtained from text information regarding manuscript page data, a scaling unit 502*a* scales the backstrip part of the virtual backstrip range so as to fit in the actual backstrip range. When a designated virtual backstrip range is different from an actual backstrip range obtained from text information regarding manuscript page data, a painting unit 502*b* paints the margin between the virtual backstrip range and the actual backstrip range in a predetermined color. A backstrip width calculation unit 502*c* calculates width information of the backstrip in manuscript page data on the basis of the number of sheets of the body, the number of sheets for use, and sheet thickness information of the body which are obtained from document information on manuscript page data.

The storage unit 503 stores document information on manuscript page data.

When the difference between a calculated print position and a print position obtained from document information on manuscript page data is equal to or larger than a predetermined value, the output unit 504 outputs warning information announcing a message to this effect.

A case binding operation of attaching a cover by the bookbinding unit 7230 will be explained with reference to FIGS. 2A to 2G.

FIGS. 2A to 2G are sectional views for explaining the case binding operation of attaching a cover by the bookbinding unit according to the embodiment of the present invention.

Figure 2A:
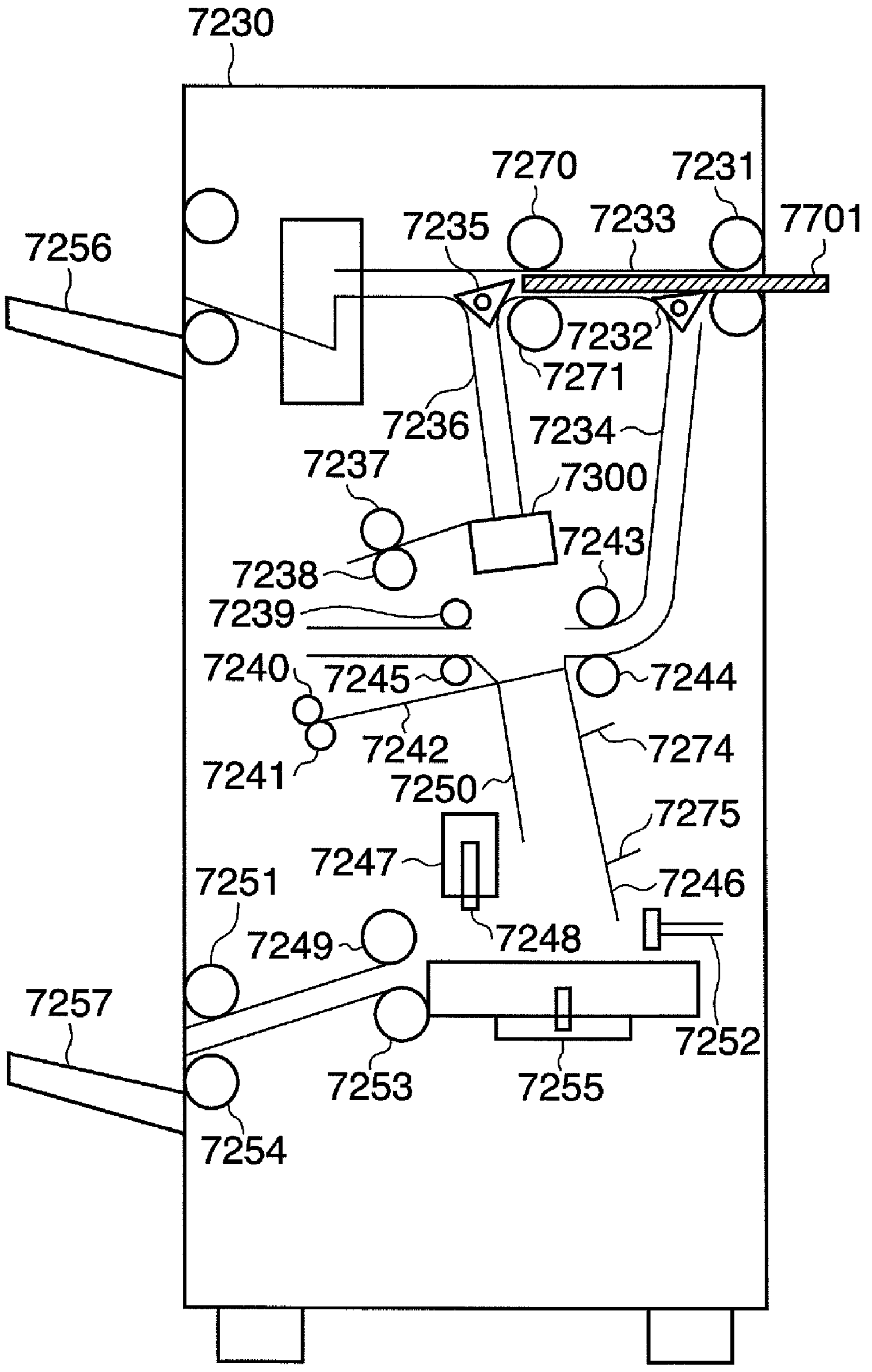
FIG. 2A is a sectional view for explaining a case binding operation of attaching a cover by a bookbinding unit according to the embodiment of the present invention.
Figure 2B:
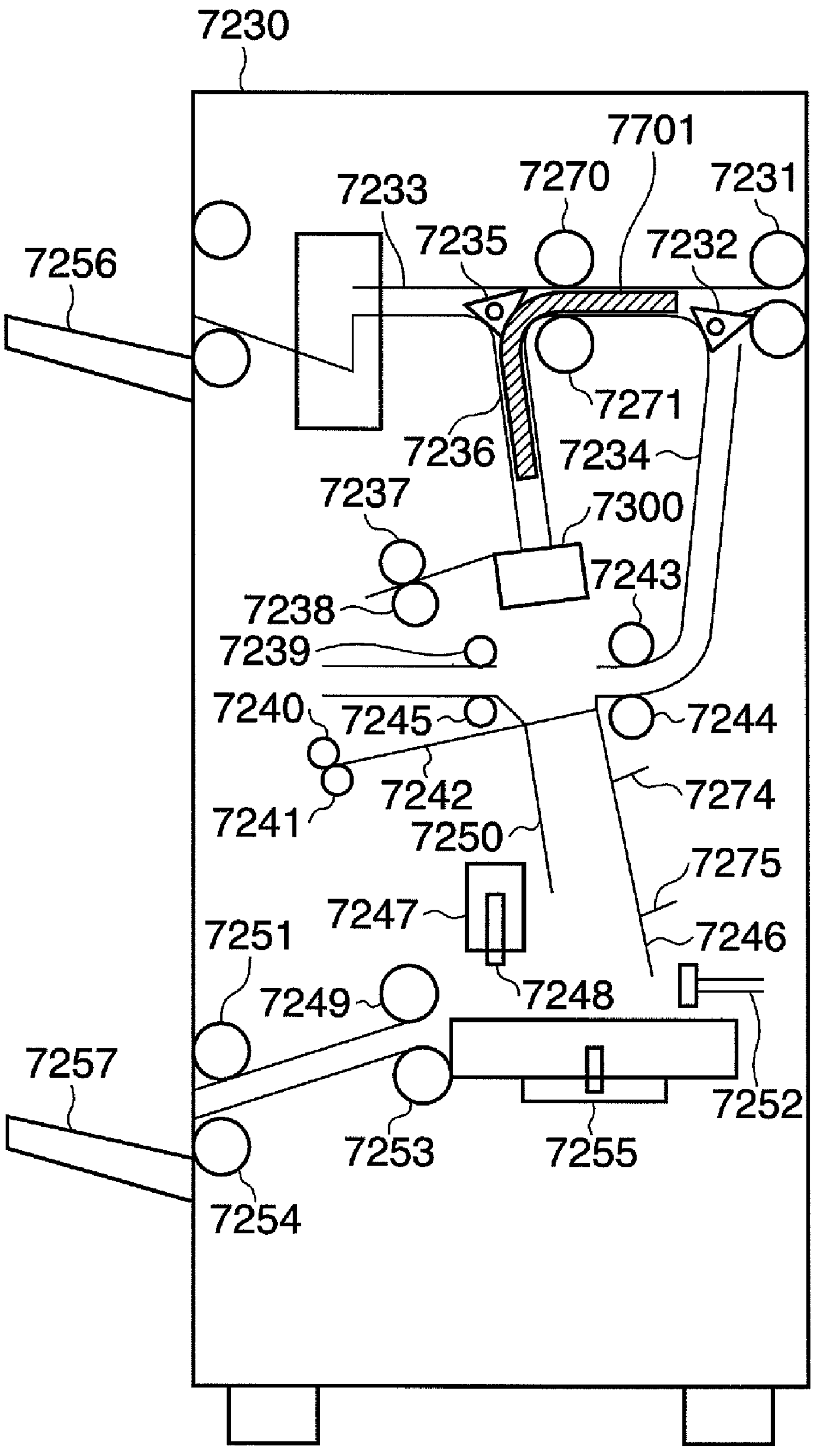
FIG. 2B is a sectional view for explaining the case binding operation of attaching a cover by the bookbinding unit according to the embodiment of the present invention.
Figure 2C:
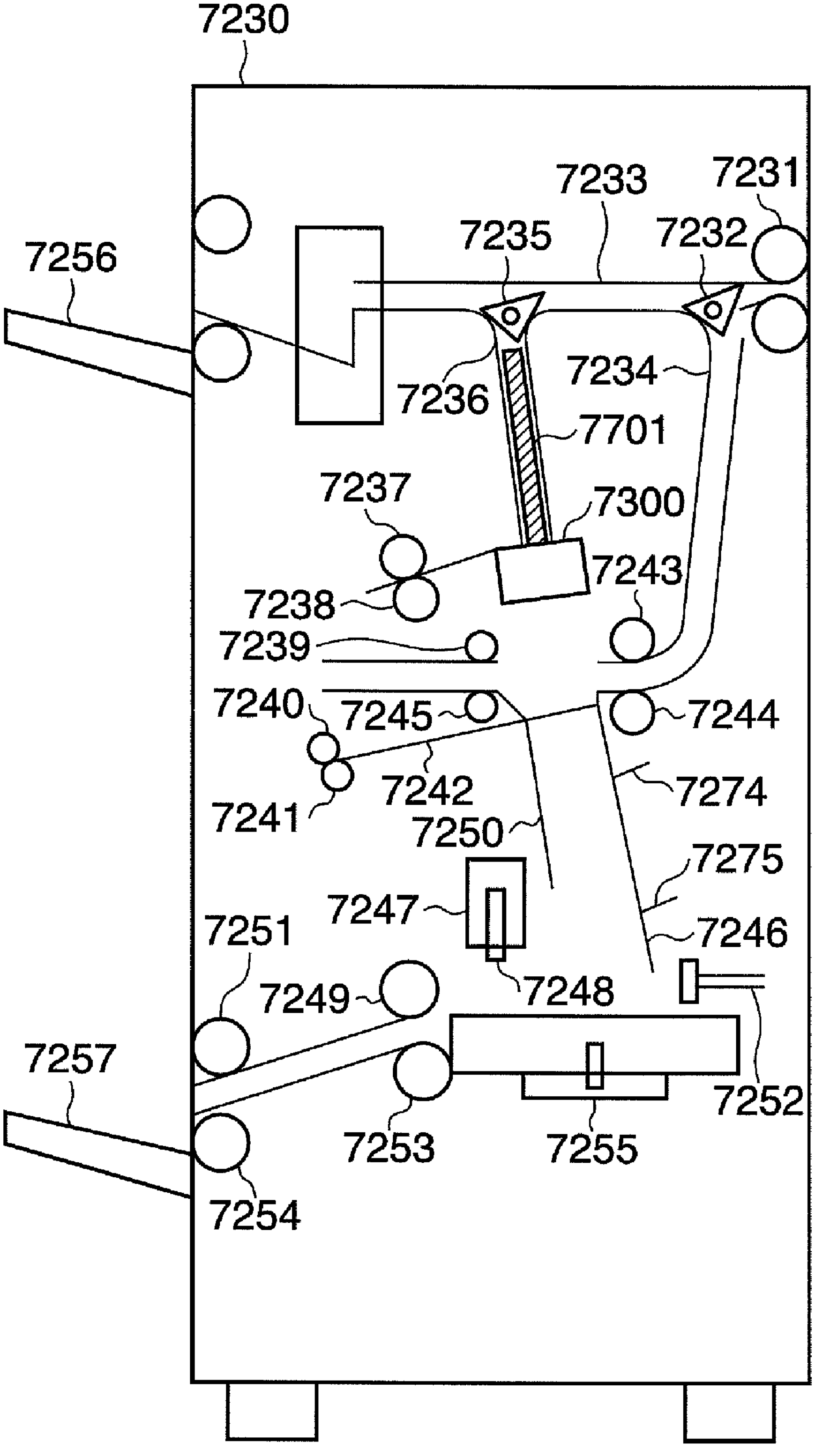
FIG. 2C is a sectional view for explaining the case binding operation of attaching a cover by the bookbinding unit according to the embodiment of the present invention.

In FIGS. 2A to 2C, a print sheet 7701 is represented in a bold line in order to explicitly indicate the sheet position, and the number of print sheets 7701 is one. In FIGS. 2D to 2G, inner sheets 7801 represent a sheet bundle.

As shown in FIG. 2A, the direction switching member 7232 switches the direction to guide the print sheet 7701 to a print sheet path 7233. The print sheet 7701 is conveyed by rollers 7270 and 7271. As shown in FIG. 2B, the direction switching member 7235 switches the direction to guide the print sheet 7701 to a stacking portion 7236. As shown in FIG. 2C, the print sheet 7701 is stored in the stacking portion 7236. Similarly, all inner sheets subjected to case binding are stored in the stacking portion 7236.

Figure 2D:
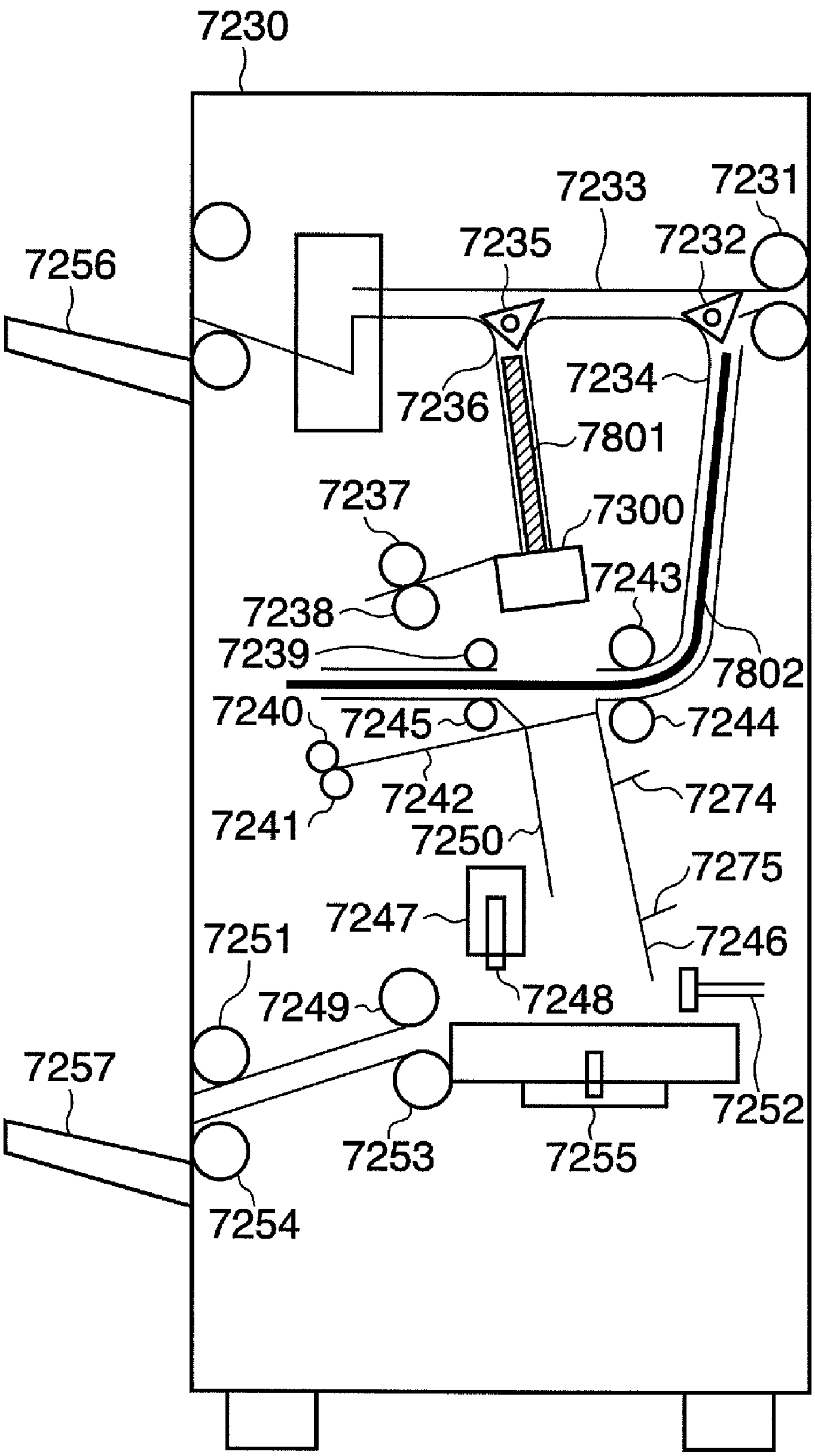
FIG. 2D is a sectional view for explaining the case binding operation of attaching a cover by the bookbinding unit according to the embodiment of the present invention.

Subsequently, as shown in FIG. 2D, a case binding cover 7802 is conveyed. The direction switching member 7232 switches the direction to guide a cover to a cover path 7234. Rollers 7243 and 7239 rotate to locate the center position of the cover at a center position between the rollers 7243 and 7239. Since the bookbinding unit 7230 recognizes the sheet size in process, it can control the rotational speeds of the rollers 7243 and 7239 such that the center of the print sheet is located at the center position between the rollers 7243 and 7239.

At this time, the gluing unit 7300 is moved from the near side to far side to glue print sheets. As shown in FIG. 1C, the gluing unit 7300 is made up of a gluing portion 7301, heater portion 7302, and sensor portion 7303. A solid glue is heated by the heater portion 7302 to a predetermined temperature to prepare for gluing. At this time, the sensor portion 7303 detects the temperature so as to prevent the glue from exceeding the predetermined temperature.

After that, a cover is glued to glued inner sheets.

Figure 2E:
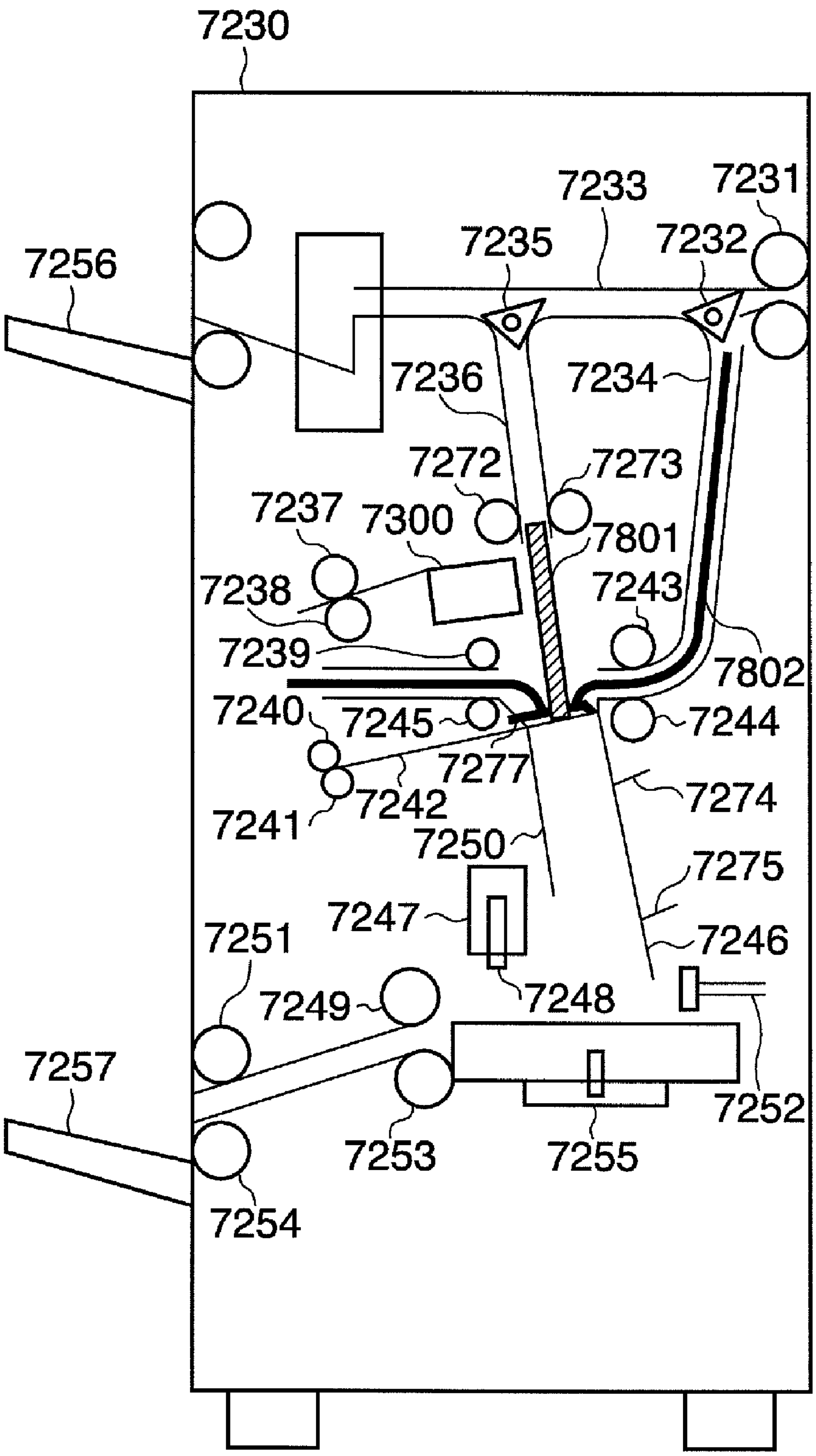
FIG. 2E is a sectional view for explaining the case binding operation of attaching a cover by the bookbinding unit according to the embodiment of the present invention.

As shown in FIG. 2E, rollers 7237 and 7238 rotate to retract the gluing unit 7300 to a predetermined position. Rollers 7272 and 7273 rotate to move down the inner sheets 7801. Rotation of the rollers 7272 and 7273 stop when the inner sheets 7801 come down to a position where they contact the cover. In this state, the inner sheets 7801 and cover are left to stand for a predetermined time. As a result, the cover is glued. At this time, in order to fold the cover, a folding member 7277 operates to fold the cover.

If the number of sheets is small when the folding member 7277 operates, the cover "wrinkles" or "is damaged". If the number of sheets to be bound is large, the sheets cannot be stored in the stacking portion 7236. For this reason, the minimum number of processible sheets and the maximum number of processible sheets must be limited in performing case binding.

For a manuscript of sheets equal to or larger than the minimum number of processible sheets and equal to or smaller than the maximum number of processible sheets, the folding member 7277 can fold the cover at a backstrip width corresponding to the manuscript thickness by applying a pressure in folding the cover.

Figure 2F:
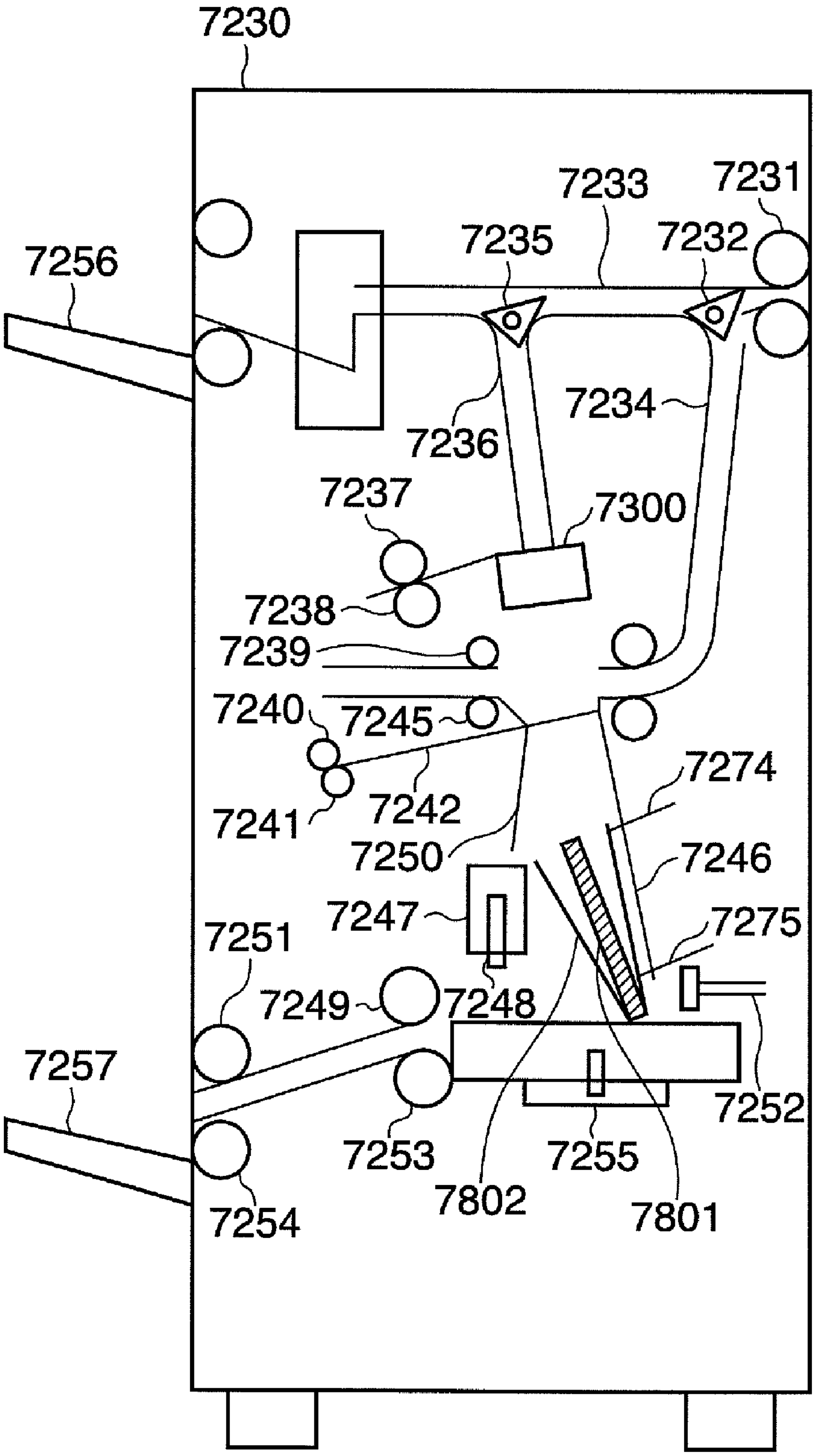
FIG. 2F is a sectional view for explaining the case binding operation of attaching a cover by the bookbinding unit according to the embodiment of the present invention.

Then, as shown in FIG. 2F, a member 7242 at the gluing position is moved to guide the glued materials to a position where their edges are cut in order to align the glued materials. At this time, members 7274 and 7275 move so that the glued materials (obtained by gluing the cover 7802 to the inner sheets 7801) fall down.

Figure 2G:
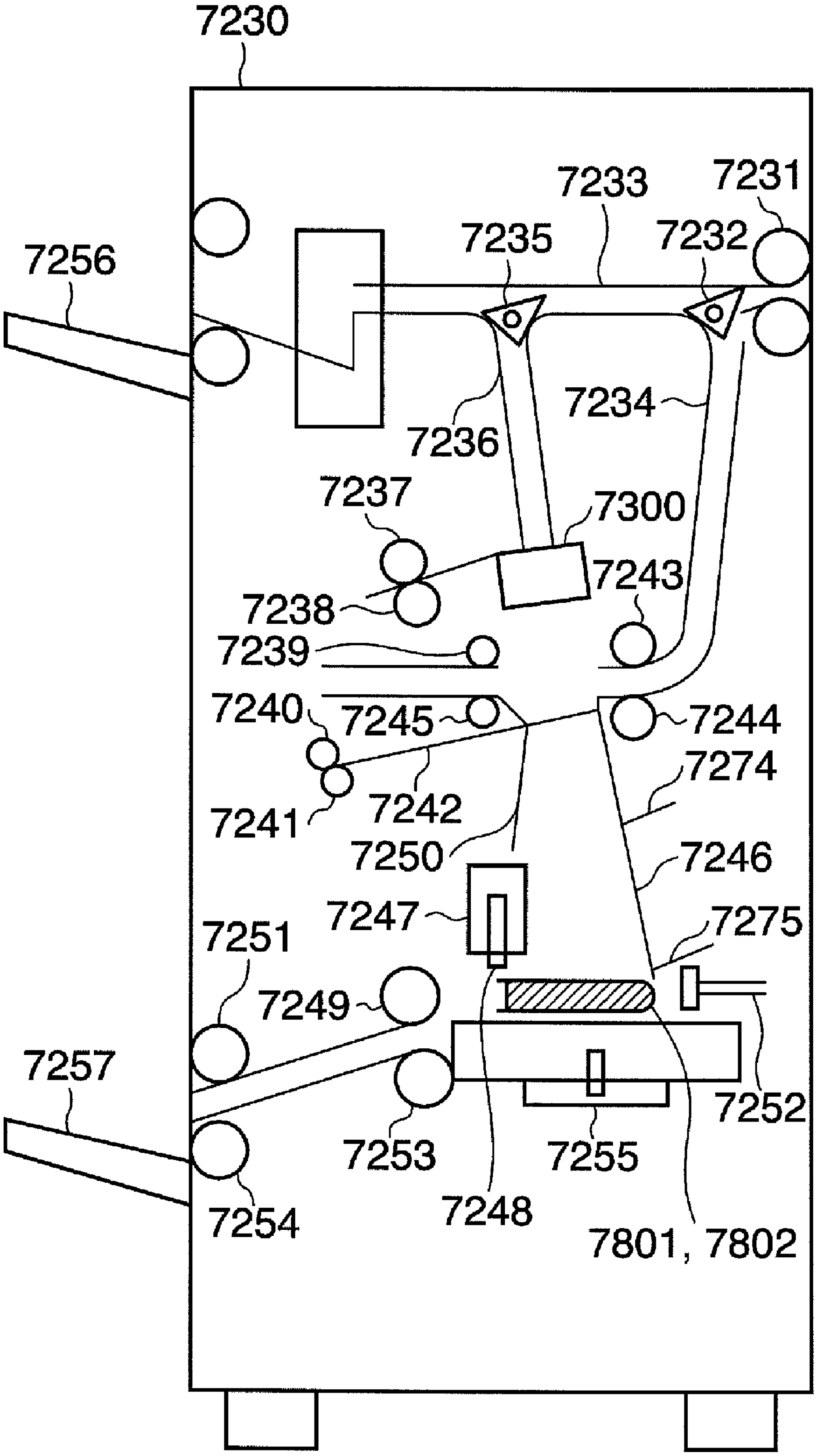
FIG. 2G is a sectional view for explaining the case binding operation of attaching a cover by the bookbinding unit according to the embodiment of the present invention.

As shown in FIG. 2G, a position control member 7252 moves to control the position on a trimmer turn table 7255. The edges of the bound materials (obtained by gluing the cover 7802 to the inner sheets 7801) stacked on the trimmer turn table 7255 are cut by moving a cutter 7248 down from a trimmer unit 7247. The trimmer turn table 7255 can rotate through 90° and 180° to cut the three edges of sheets. The position control member 7252 moves toward the tray 7257, and rollers 7249, 7253, 7251, and 7254 rotate to discharge the cut product onto the tray 7257.

<Example of Format of Electronic Manuscript Data>

Before referring to details of the bookbinding application 104, the data format of a book file will be explained.

The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book can contain a plurality of chapters, and one chapter can contain a plurality of pages.

Figure 3:
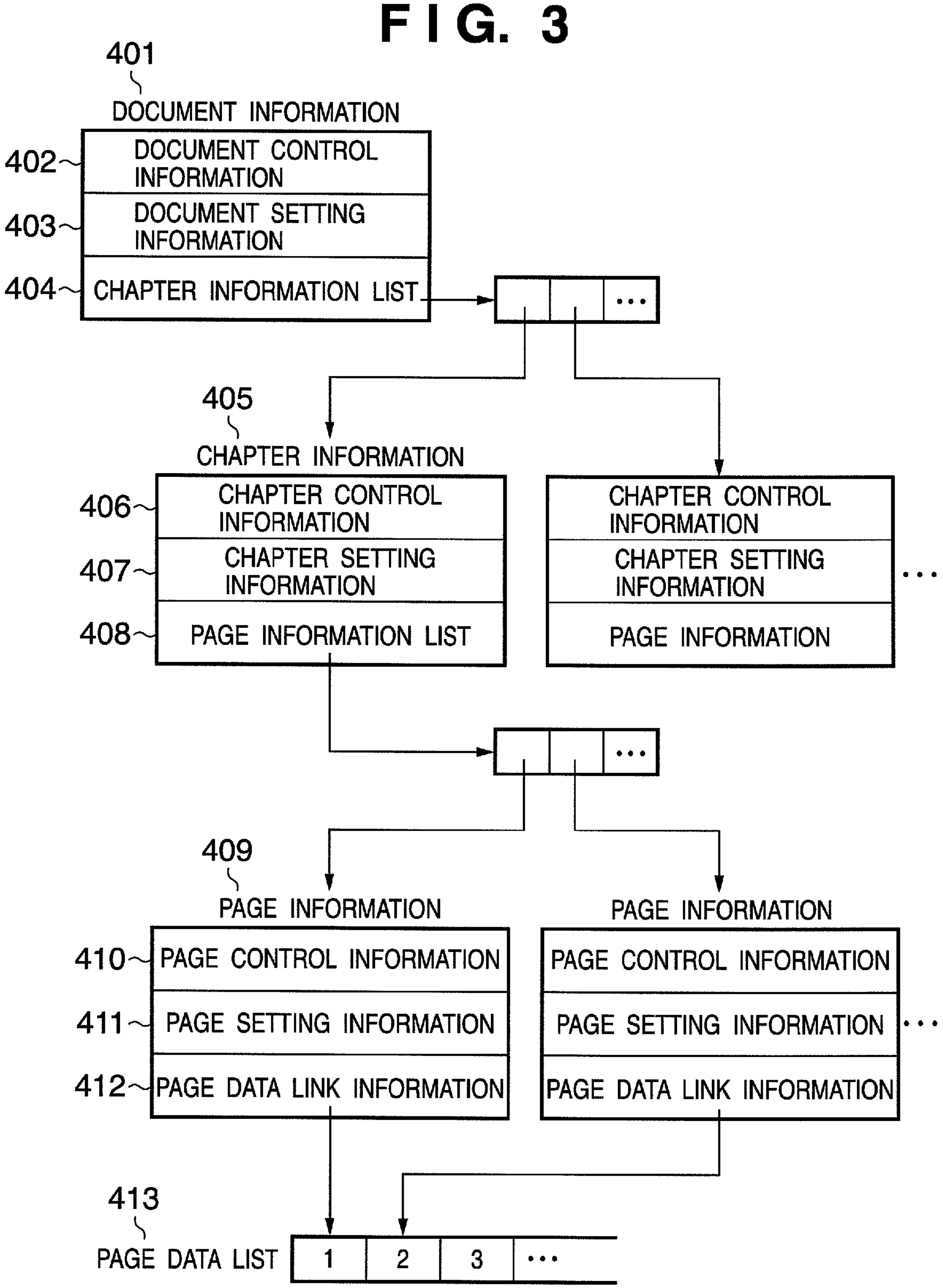
FIG. 3 is a view schematically showing an example of the data format of a book file according to the embodiment of the present invention.

FIG. 3 is a view schematically showing an example of the data format of the book file according to the embodiment of the present invention.

A book, chapter, and page in the book file of this example are represented by corresponding nodes. One book file contains one book. The book and chapter are a concept for defining a book structure, and contain, as entities, defined attribute values and links to lower layers. The page has, as entities, data of each page output from an application program. The page contains a manuscript page entity (manuscript page data) and a link to each manuscript page data in addition to an attribute value.

Note that a print page to be output to a print sheet such as a sheet medium may contain a plurality of manuscript pages. This structure is displayed not by a link, but by attributes in book, chapter, and page layers.

Since the book file in FIG. 3 need not be one completed book, "book" is generalized as a "document".

The document has document information 401 at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form the document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created so that the first chapter has a 2-UP layout and the remaining chapters have a 4-UP layout. The page information list 408 holds as a list a set of manuscript pages which form each chapter. The page information list 408 designates page information data 409.

The page information data 409 is also roughly divided into three parts 410 to 412. The page control information 410 holds information such as a page number displayed at the tree. The page setting information 411 holds information such as the page rotation angle and page layout position information, and corresponds to manuscript page attributes. The page data link information 412 is manuscript data corresponding to a page. In this example, the page information data 409 does not directly have manuscript data, but has only the link information 412. Actual manuscript data is held by a page data list 413.

FIGS. 4A and 4B are tables showing an example of book attributes (document setting information 403) according to the embodiment of the present invention.

In general, as for an item which can be defined repetitively on lower and upper layers, the attribute value of the lower layer is preferentially adopted. As for an item contained in only a book attribute, a value defined in the book attribute is effective throughout the book. As for an item which overlaps that on the lower layer, the attribute value represents a specified value when no value is defined on the lower layer. In this example, however, whether to give priority to an attribute value on the lower layer can be selected. Note that each item shown in FIGS. 4A and 4B does not correspond to one concrete item, but may contain a plurality of relevant items.

Items unique to the book attribute are six items: printing method, details of bookbinding, front cover/backstrip/back cover, index sheet, slip sheet, and chapter segmentation. These items are defined throughout the book. As the printing method attribute, three values, i.e., single-sided printing, double-sided printing, and bookbinding printing can be designated. Bookbinding printing is to fold and bind printed sheets into a book by saddle stitching, flat stitching, thread stitching, perfect binding, or the like. Case biding printing can also be designated as bookbinding printing. As the detailed bookbinding attribute, the opening direction and the number of sheets to be bundled can be designated when bookbinding printing is designated.

The front cover/backstrip/back cover attribute includes designation of adding sheets serving as a front cover, backstrip, and back cover when an electronic manuscript file combined as a book is printed, and designation of contents to be printed on the added paper sheets. When case binding printing is designated as bookbinding printing, the backstrip attribute is added.

The index sheet attribute includes designation of inserting a tabbed index sheet separately prepared in a printing apparatus for chapter segmentation, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the inserting sheet attribute.

The inserting sheet attribute includes designation of inserting a sheet fed from an inserter or sheet feed cassette for chapter segmentation, and designation of a sheet feed source when an inserting sheet is inserted.

The chapter segmentation attribute includes designation of whether to use a new paper sheet, use a new print page, or do nothing particular at a chapter break. In single-sided printing, the use of a new paper sheet and the use of a new print page are the same. In double-sided printing, successive chapters are not printed on one paper sheet if "the use of a new paper sheet"; is designated, but may be printed on the obverse and reverse of one paper sheet if "the use of a new print page" is designated.

FIG. 5 is a table showing an example of chapter attributes (chapter setting information 407) according to the embodiment of the present invention. FIG. 6 is a table showing an example of page attributes (page setting information 411) according to the embodiment of the present invention. The relationship between the chapter attribute and the page attribute is the same as that between the book attribute and the lower layer attribute.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected (to be described later).

Items common to only the book and chapter attributes are five items: sheet size, sheet orientation, N-up printing designation, enlargement/reduction, and delivery method. The N-up printing designation attribute is an item for designating the number of manuscript pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

Items unique to the page attribute are page rotation designation, zoom, layout position, annotation, and page separation. The page rotation designation attribute is an item for designating the rotation angle when a manuscript page is laid out on a print page. The zoom attribute is an item for designating the scaling ratio of a manuscript page. The scaling ratio is designated based on a virtual logical page region size=100%. The virtual logical page region is a region occupied by one manuscript page when manuscript pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page attributes are a watermark attribute and header/footer attribute. The watermark is a separately designated image or character string printed over data created by an application. The header/footer is a watermark printed at the upper or lower margin of each page. For the header/footer, items which are pieces of information such as a page number, and date and time and can be designated by variables are prepared.

Contents which can be designated by the watermark attribute and header/footer attribute are common between the chapter and the page, but are different from those of the book. The book can set the watermark and header/footer contents. The book can designate how to print a watermark or header/footer throughout the book. To the contrary, the chapter and page can only designate whether to print a watermark or header/footer set by the book on the chapter or page.

<Example of Operation Sequence of Document Processing System According to Embodiment>

(Example of Editing Book File)

Chapters and pages in an electronic manuscript file can be edited as follows.

(1) New document
(2) Delete
(3) Copy
(4) Cut
(5) Paste
(6) Move
(7) Change chapter name
(8) Reassign page number/name
(9) Insert cover
(10) Insert inserting sheet
(11) Insert index sheet
(12) Page layout of each manuscript page In addition, an operation of canceling an executed editing operation, and an operation of restoring a canceled operation can be performed. These editing functions enable editing operations such as consolidation of a plurality of book files, rearrangement of chapters and pages within a book file, delete of chapters and pages within a book file, layout change of a manuscript page, and insertion of an inserting sheet and index sheet.

By these editing operations, operation results are reflected in attributes shown in FIGS. 4A to 6 or in the structures of the book file. For example, a blank page is inserted to a designated portion by an operation of newly adding a blank page. The blank page is processed as a manuscript page. If the layout of a manuscript page is changed, the change contents are reflected in attributes such as the printing method, N-up printing, front cover/backstrip/back cover, index sheet, inserting sheet, and chapter segmentation.

A display and operation example in editing in this example will be described in detail below.

(Example of Output of Book File)

Figure 8:
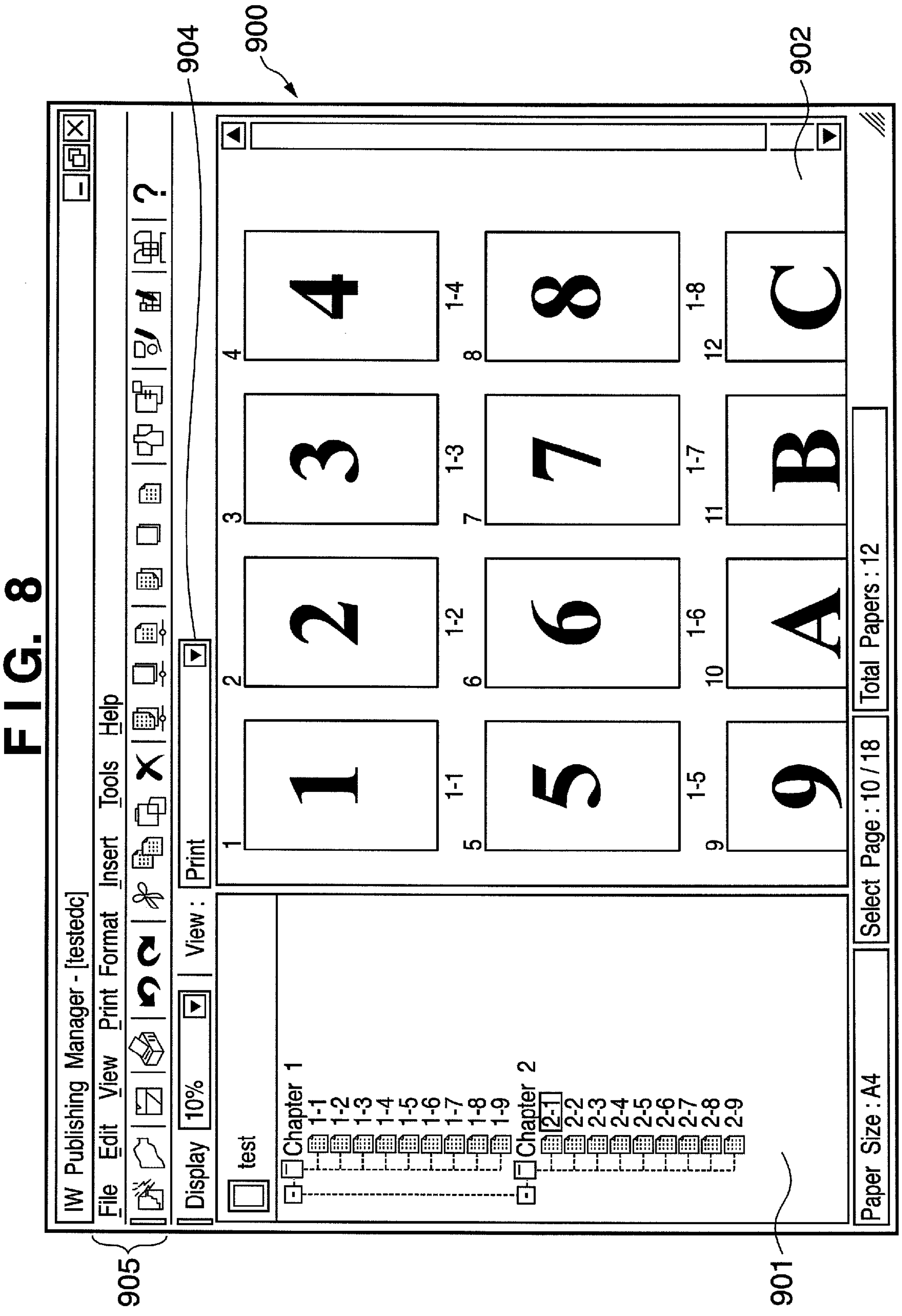
FIG. 8 is a view showing an example of the operation window of a bookbinding application according to the embodiment of the present invention.

The ultimate goal of a book file created and edited in the above manner is to print out the file. If the user selects a file menu from the UI (User Interface) window (operation window: FIG. 8) of the bookbinding application shown and selects printing from this menu, the book file is then printed out by a designated output device.

At this time, the bookbinding application 104 creates a job ticket from a currently open book file, and transfers the job ticket to the electronic manuscript de-spooler 105. The electronic manuscript de-spooler 105 converts the job ticket into an OS output command, e.g., a Windows GDI command, and transmits the command to an output module, e.g., GDI. The output module generates a command complying with a device by the designated printer driver 106, and transmits the command to the device.

More specifically, the graphic engine of the output module loads the printer driver 106 prepared for each printing apparatus from the external memory 211 to the RAM 202, and sets the output to the printer driver 106. The output module converts the received GDI (Graphic Device Interface) function into a DDI (Device Driver Interface) function, and outputs the DDI function to the printer driver 106.

The printer driver 106 converts the received output into a control command such as a PDL (Page Description Language) command recognizable by the printer on the basis of the DDI function received from the output module. The converted printer control command passes through a system spooler loaded by the OS to the RAM 202, and is output as print data to the printer 107 via the interface 21.

The job ticket is data having a structure whose minimum unit is a manuscript page. The structure of the job ticket defines the layout of a manuscript page on a paper sheet. One job ticket is issued for one print job.

The document node is set at the top of the structure, and defines the attribute of the whole document, e.g., an attribute such as double-sided printing/single-sided printing. This node is accompanied with a paper node containing attributes such as the identifier of a paper sheet for use and designation of a feed port in the printer.

Each paper node is accompanied with a sheet node which is printed on the paper. One sheet corresponds to one paper sheet. A print page (physical page) belongs to each sheet. One physical page belongs to one sheet in single-sided printing, and two physical pages belong to one sheet in double-sided printing. A manuscript page to be laid out on a physical page belongs to the physical page. The physical page attribute contains a manuscript page layout.

An example of the data structure of a job ticket will be explained with reference to FIG. 7.

Figure 7:
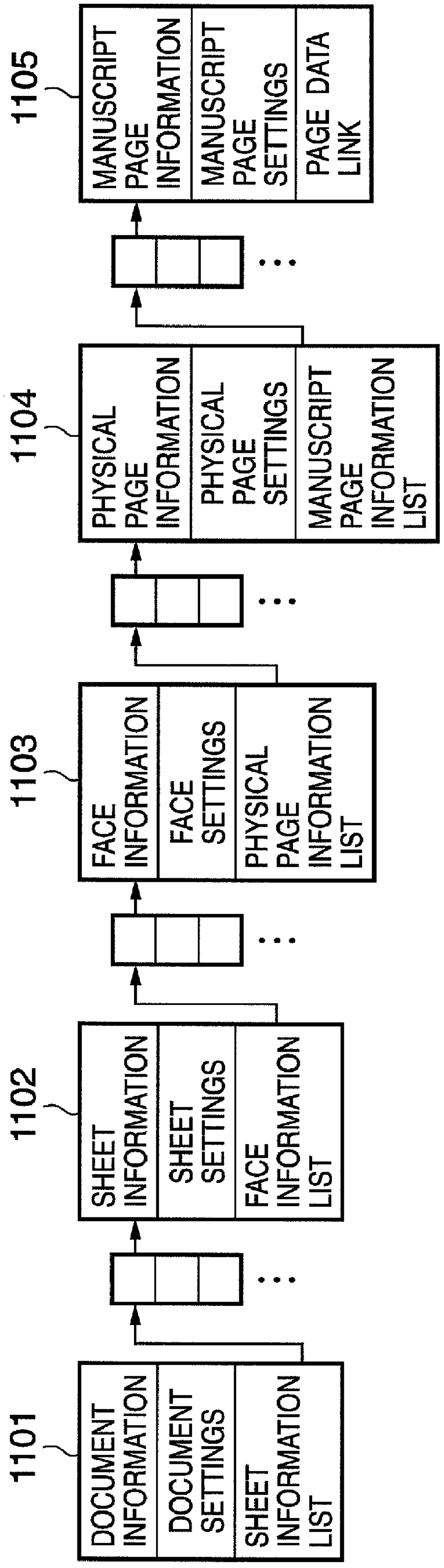
FIG. 7 is a view showing an example of the data structure of a job ticket according to the embodiment of the present invention.

FIG. 7 is a view showing an example of the data structure of a job ticket according to the embodiment of the present invention.

In print data, a document is formed from a set of sheets, and each sheet is formed from two, upper and lower surfaces. Each of the upper and lower surfaces has a region (physical page) for laying out a manuscript, and each physical page is formed from a set of manuscript pages serving as minimum units.

In FIG. 7, document information 1101 is data corresponding to a document, and is made up of information (document settings) on a whole document and a list of pieces of sheet information forming the document. Sheet information 1102 is formed from information (sheet settings) on a sheet such as the sheet size, and a list of pieces of face information laid out on the sheet.

Face information 1103 is formed from information (face settings) unique to a face, and a list of pieces of physical page information on physical pages laid out on the face. Physical page information 1104 is formed from information physical page settings) such as the size and header/footer of a physical page, and a list of pieces of manuscript page information on manuscript pages which form the physical page. Manuscript page information 1105 is formed from information (manuscript page settings) on manuscript pages, and a link to manuscript page data.

The electronic manuscript de-spooler 105 converts the job ticket into an output command to an output module.

(Example of Preview Display Contents)

As described above, when a book file is opened by the bookbinding application 104, an operation window 900 shown in FIG. 8 is displayed.

Details of the operation window will be explained with reference to FIG. 8.

FIG. 8 is a view showing an example of the operation window of the bookbinding application according to the embodiment of the present invention.

In the operation window 900, a tree portion 901 displays a tree representing the structure of an open book (to be referred to as a "book of interest" hereinafter). At a preview portion 902, three display methods are prepared in accordance with designation by the user.

The first display method is a mode called a manuscript view which directly displays manuscript pages. In the manuscript view mode, the contents of manuscript pages belonging to the book of interest are reduced and displayed at the preview portion 902. In the manuscript view mode, the display of the preview portion 902 does not reflect any layout.

The second display method is a printing view mode. In the printing view mode, the preview portion 902 displays manuscript pages in a format which reflects the layout of them.

The third display method is a simple printing view mode. In the simple printing view mode, the contents of manuscript pages are not reflected in the display of the preview portion 902, but only the layout is reflected.

Note that these modes are switched by operating a mode switching portion 904. The mode switching portion 904 is implemented by a pull-down menu. The user can switch to an intended mode by selecting an arbitrary one of modes registered in the pull-down menu.

(Example of Editing Operation of Bookbinding Application)

The operation window 900 implemented by the bookbinding application 104 enables editing operations such as a change of the page order of a document, copying, and deletion. In addition, the operation window 900 also enables a setting operation for function settings (e.g., stapling) of the printing apparatus. A designated printing apparatus can be caused to print.

These operations can be implemented by commands registered in various menus and a tool bar (made up of icons) 905 at an upper portion in the operation window 900.

At the tree portion 901 on the left in the operation window 900, a tree view representing the structure of a document is displayed. The document is formed from a set of chapters (Chapter 1, 2, . . . ), and each chapter is formed from manuscript pages (1-1, 1-2, . . . , 2-1, 2-2, . . . ).

At the preview portion 902 on the right in the operation window 900, a preview of each page is displayed by a designated display method, as described above. At the tree portion 901 and preview portion 902, a page to be edited is selected, and an operation by a menu operation is done. Then, information corresponding to the menu operation is stored or updated in the document information 401 in FIG. 3.

[Example of Backstrip Editing Operation in Document Processing System]

When case binding printing is designated as the printing method attribute in the book attributes (document setting information 403), data of a front cover, backstrip, and back cover are printed on one print sheet, and more detailed settings can be made as detailed bookbinding attributes. A bookbinding attribute setting window serving as an operation window for setting detailed bookbinding attributes will be explained with reference to FIG. 9.

Note that the bookbinding attribute setting window is implemented by the bookbinding application 104. More specifically, when case binding printing is designated in the tool bar 905 and details of bookbinding are designated in the user interface of the bookbinding application in FIG. 8, the bookbinding attribute setting window in FIG. 9 is displayed.

Figure 9:
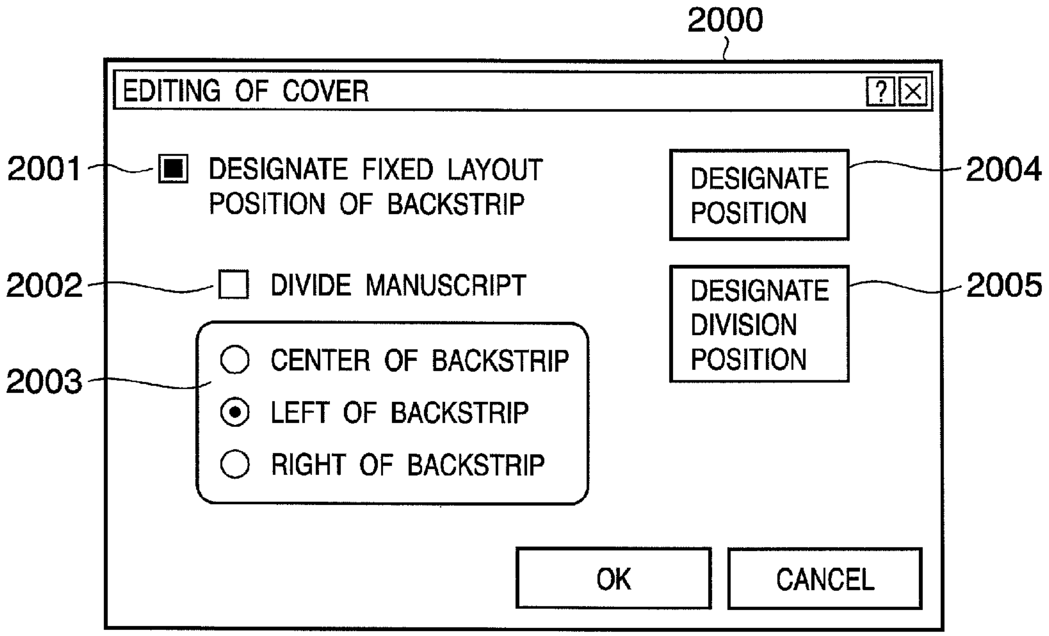
FIG. 9 is a view showing an example of a bookbinding attribute setting window according to the embodiment of the present invention.

FIG. 9 is a view showing an example of the bookbinding attribute setting window according to the embodiment of the present invention.

A bookbinding attribute setting window 2000 has various controls (e.g., a check box control, radio button control, and button control) for making various settings on bookbinding attribute settings.

Reference numeral 2001 denotes a position designation validation portion. The position designation validation portion 2001 is a control for validating designation of the fixed layout position of the backstrip on a manuscript page for which no front cover, backstrip, or back cover is defined in a manuscript loaded into the bookbinding application 104. The fixed layout position of the backstrip serves as a reference (reference position) for the backstrip folding position (reference axis for dividing a manuscript page into an area where the backstrip is laid out, and a front or back cover) in case binding.

As described with reference to FIGS. 2D and 2E, the bookbinding apparatus according to the embodiment folds at the center a cover sheet serving as the front cover, backstrip, and back cover. As will be described below, manuscript data of the front cover, backstrip, and back cover are laid out on the cover sheet serving as the front cover, backstrip, and back cover on the basis of the designated reference position. The position designation validation portion 2001 does not require any setting when the front cover, backstrip, and back cover of a manuscript loaded in the bookbinding application 104 are defined.

Reference numeral 2002 denotes a division position designation validation portion. The division position designation validation portion 2002 is a control for validating designation of a division position (designation of the backstrip range) for defining each cover part of a manuscript page for which no front cover, backstrip, or back cover is defined in a manuscript loaded into the bookbinding application 104. The division position designation validation portion 2002 is necessary for a case (to be described with reference to FIG. 18A and subsequent drawings) where a cover manuscript is divided into three parts: the front cover, backstrip, and back cover.

The position designation validation portion 2001 and division position designation validation portion 2002 are implemented by check box controls. Processes by the respective validation portions become effective by checking corresponding check boxes.

Reference numeral 2003 denotes a position selection portion. The position selection portion 2003 is a control for, when designation by the position designation validation portion 2001 is done, validating selection and selecting the backstrip alignment position (backstrip print position). The position selection portion 2003 is implemented by a radio button control, and one of three positions (center, left, and right) can be selected as the backstrip alignment position.

Since the print layout of a manuscript page is assumed to be horizontal opening, the center, left, and right positions are prepared as choices of the backstrip alignment position. When the print layout is vertical opening, the center, upper, and lower positions are prepared as choices of the backstrip alignment position.

In other words, at least one of the center of the backstrip, the first end serving as one end of the backstrip, and the second end serving as the other end of the backstrip can be designated. In other words, the center of the backstrip, the area between the backstrip and the front cover, and the area between the backstrip and the back cover can be designated.

In horizontal opening, the center of the backstrip coincides with a position where the backstrip is divided equally in the vertical direction (longitudinal direction). The first and second ends correspond to the left side (left end) and right side (right end) of the backstrip or its right side (right end) and left side (left end).

In vertical opening, the center of the backstrip coincides with a position where the backstrip is divided equally in the horizontal direction (lateral direction). The first and second ends correspond to the upper side (upper end) and lower side (lower end) of the backstrip or its lower side (lower end) and upper side (upper end).

Reference numeral 2004 denotes a position designation portion. The position designation portion 2004 is a control for designating display of a position designation window for actually displaying the contents of position designation and adjusting a designated position while position designation is validated at the position designation validation portion 2001 and a selection is made at the position selection portion 2003. The position designation portion 2004 is implemented by a button control. When this button is operated, a position designation window (FIG. 10) is displayed.

The backstrip alignment position designated by the position selection portion 2003 and the fixed layout position designated by the position designation portion 2004 are stored in the backstrip attribute of the book attributes (document setting information 403) in FIGS. 4A and 4B.

Reference numeral 2005 denotes a division position designation portion. The division position designation portion 2005 is a control for designating display of a position designation window for actually displaying designation contents of the division position and adjusting the designated position while division position designation is validated at the division position designation validation portion 2002. The division position designation portion 2005 is implemented by a button control. When this button is operated, a division position designation window (FIG. 11) is displayed.

An example of an operation of displaying the position designation window will be explained.

If the position designation portion 2004 is operated while position designation is validated at the position designation validation portion 2001 and the position is selected at the position selection portion 2003 in the bookbinding attribute setting window 2000, the position designation window is displayed. The position designation window allows designating a print position such that a designated front cover/backstrip/back cover in a manuscript page is printed at a backstrip alignment position (one of the center, left, or right) on one print sheet that is designated at the position selection portion 2003.

An example of the position designation window will be explained with reference to FIG. 10.

Figure 10:
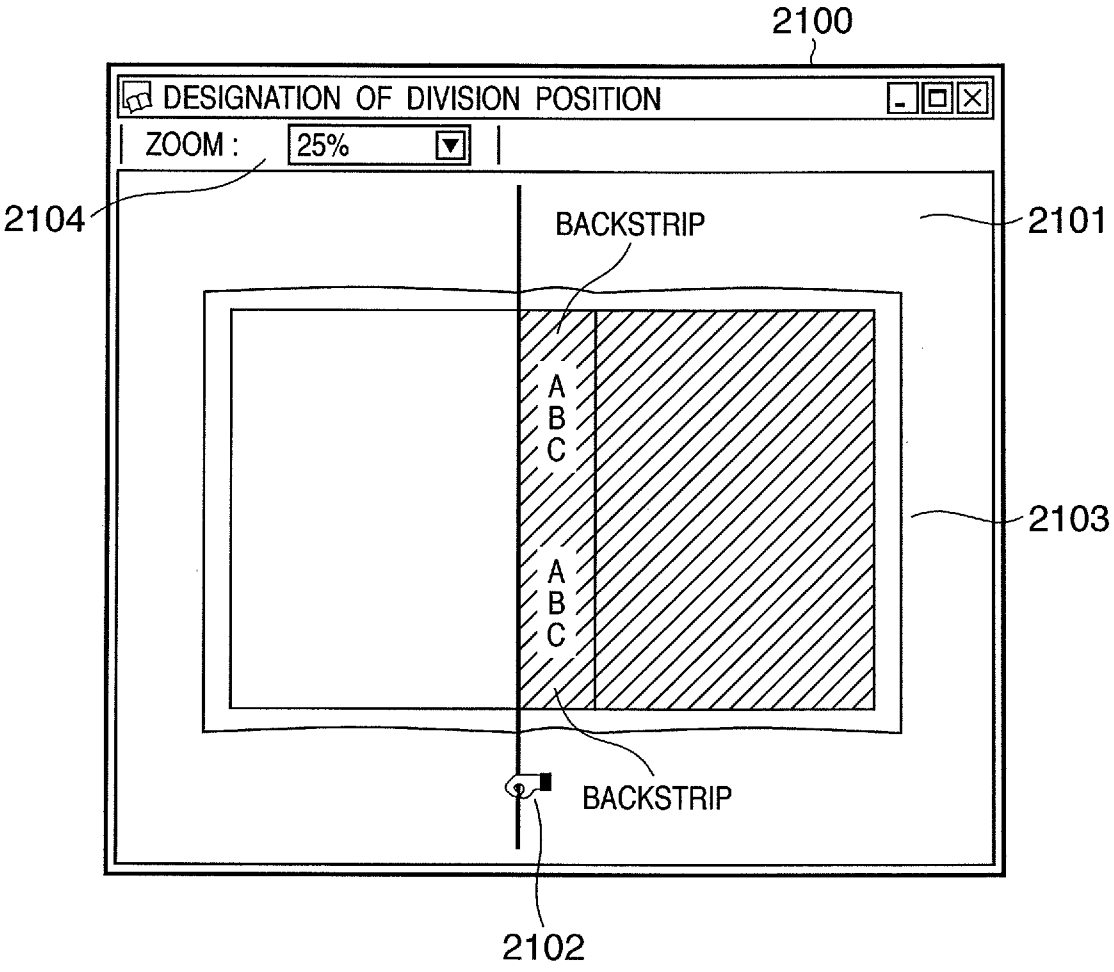
FIG. 10 is a view showing an example of a position designation window according to the embodiment of the present invention.

FIG. 10 is a view showing an example of the position designation window according to the embodiment of the present invention.

In a position designation window 2100, reference numeral 2101 denotes a preview area where the contents of a manuscript page 2103 (front cover/backstrip/back cover) to be processed are displayed.

The cover manuscript page 2103 to be processed may be selected from the preview area shown in FIG. 8 via a mouse operation, or selected by inputting the page number of a cover manuscript page in selection at the position designation portion 2004 in FIG. 9.

Instead of a manual selection operation by the user, the front cover/backstrip/back cover manuscript page may be determined from its manuscript size because its manuscript size is larger than that of the remaining body pages. Note that the size of the front cover/backstrip/back cover manuscript page is obtained by further adding the size of the backstrip to double the size of the remaining body pages.

Reference numeral 2104 denotes a zoom designation portion. The zoom designation portion 2104 is a control for enlarging/reducing display of the manuscript page 2103. The zoom designation portion 2104 is implemented by a pull-down menu control. The user can select a desired zoom ratio from various zoom ratios (25%, 50%, 75%, 100%, and the like) registered in the pull-down menu, and zoom display of the manuscript page 2103 at the selected zoom ratio. Alternatively, the user can directly input an arbitrary zoom ratio in the pull-down menu, and zoom display of the manuscript page 2103 can be performed at the input zoom ratio.

Reference numeral 2102 denotes a cursor (fixed layout position designation unit) which can be operated to the right and left in the preview area 2101. The user can move the cursor 2102 to an arbitrary position to designate the fixed layout position of the backstrip on the manuscript page 2103. The designated fixed layout position is stored in the backstrip attribute of the book attributes (FIGS. 4A and 4B) as the value of the distance from the left side of a manuscript page to a position designated with the cursor.

When the front cover, backstrip, and back cover are defined for a manuscript page, the display position (reference position) of the cursor 2102 is set in the initial state at a backstrip alignment position selected at the position selection portion 2003. The initial state represents a state when the position designation window is displayed by operating the position designation portion 2004.

That is, when the selected position is "the center of the backstrip", the cursor 2102 is displayed in the initial state at the center of the backstrip part of the manuscript page 2103. When the selected position is "the left side of the backstrip" or "the right side of the backstrip", the cursor 2102 is displayed in the initial state at a position which is set back inward from the left or right of the manuscript page 2103 by an offcut width and body manuscript width designated in the document information 401.

That is, when the front cover, backstrip, and back cover are defined for a cover manuscript page, the user need not always designate the fixed layout position at the position designation portion 2004, and the position designation window in FIG. 10 is displayed to confirm the layout position.

When no front cover, backstrip, or back cover is defined for the manuscript page, the cursor 2102 is displayed at the initial position (reference position). When the left side of the backstrip is selected at position selection portion 2003, the predetermined position is moved from the left side of the cover manuscript page to the right by the manuscript size of the body.

In this manner, the user can designate the fixed layout position of the backstrip in a manuscript page via the position designation window 2100. By using the bookbinding attribute setting window 2000 and position designation window 2100, the user can print a manuscript page in which the reference (fixed layout position) of the backstrip in the manuscript page intended by the user and a designated backstrip alignment position are aligned to each other.

Note that the operation target of the position designation window 2100 is one manuscript page data having a series of the front cover, backstrip, and back cover, but is not limited to this. For example, some manuscript page data are formed from at least one of the front cover, backstrip, and back cover. A case is also assumed where the user wants to process manuscript page data having a series of the front cover, backstrip, and back cover obtained by arbitrarily combining manuscript page data.

In this case, an arbitrary combination of manuscript page data of the front cover, backstrip, and back cover is selected, and the manuscript page data of the front cover, backstrip, and back cover are concatenated to generate manuscript page data having a series of the front cover, backstrip, and back cover. The concatenation function can be implemented by arranging, in the bookbinding attribute setting window 2000, a control (not shown) such as a reference menu for referring to and selecting an electronic manuscript format or the book file 103.

An example of an operation of displaying the division position designation window will be explained.

In the bookbinding attribute setting window 2000, when the division position designation portion 2005 is operated while division position designation is validated at the division position designation validation portion 2002 and a position is selected at the position selection portion 2003, the division position designation window is displayed. A manuscript page is divided at boundary positions between the front cover, the backstrip, and the back cover that are designated in the division position designation window. Then, print positions are designated such that the designated boundaries between the front cover and the backstrip, and between the backstrip and the back cover are printed at the two ends of the actual backstrip.

An example of the division position designation window will be explained with reference to FIG. 11.

Figure 11:
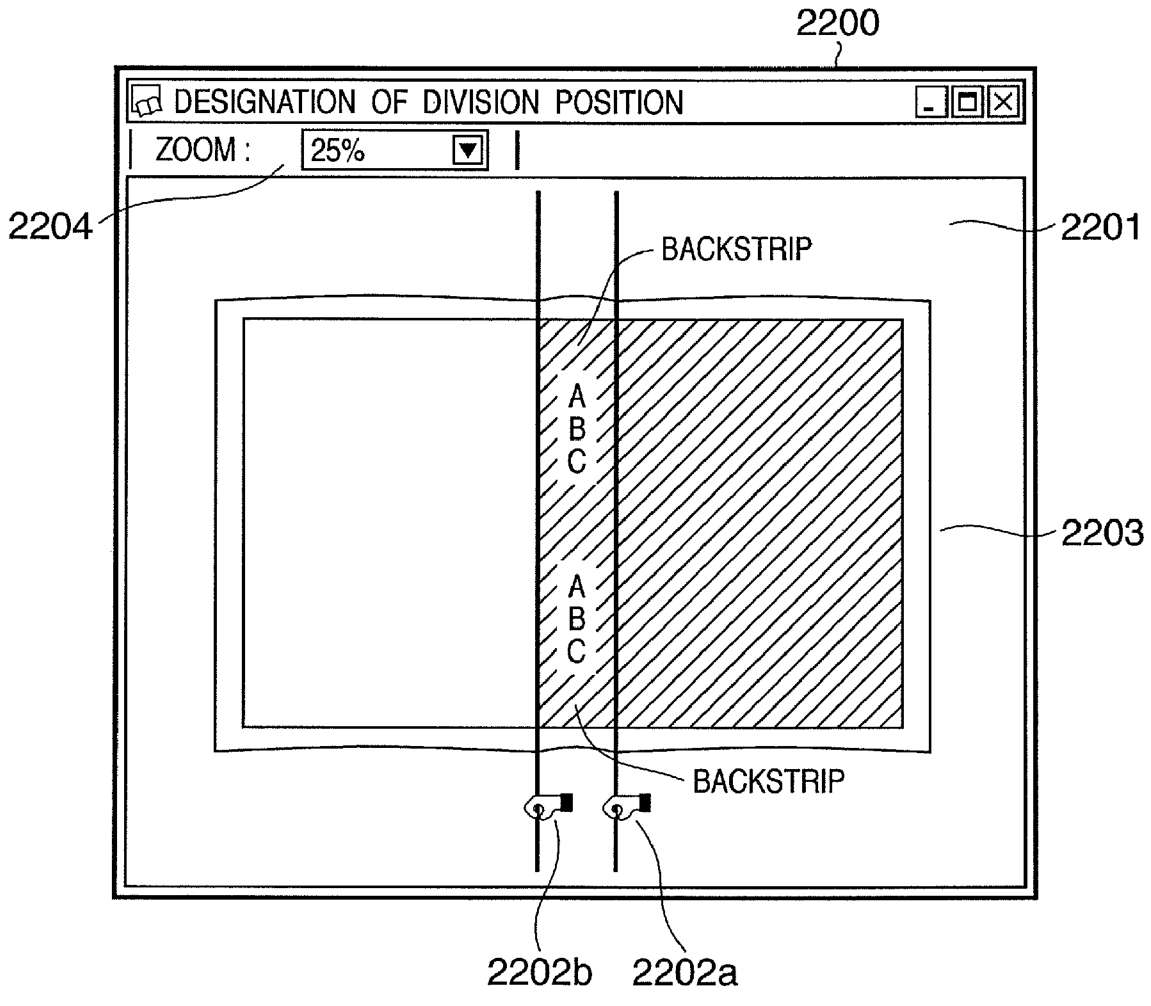
FIG. 11 is a view showing an example of a division position designation window according to the embodiment of the present invention.

FIG. 11 is a view showing an example of the division position designation window according to the embodiment of the present invention.

In a division position designation window 2200, reference numeral 2201 denotes a preview area where the contents of a manuscript page 2203 to be processed are displayed.

As described above for the division position designation validation portion 2002, the division position designation window is displayed when a cover manuscript needs to be divided into three parts: the front cover, backstrip, and back cover, which will be described with reference to FIG. 18A and subsequent drawings.

The manuscript page 2203 of a cover to be processed may be selected from the preview area shown in FIG. 8 via a mouse operation, or selected by inputting the page number of a cover manuscript page in selection at the position designation portion 2004 in FIG. 9.

Instead of a manual selection operation by the user, the front cover/backstrip/back cover manuscript page may be determined from its manuscript size because its manuscript size is larger than that of the remaining body pages.

Reference numeral 2204 denotes a zoom designation portion. The zoom designation portion 2204 is a control for enlarging/reducing display of the manuscript page 2203. The zoom designation portion 2204 is implemented by a pull-down menu control. The user can select a desired zoom ratio from various zoom ratios (25%, 50%, 75%, 100%, and the like) registered in the pull-down menu, and zoom display of the manuscript page 2203 at the selected zoom ratio. Alternatively, the user can directly input an arbitrary zoom ratio in the pull-down menu, and zoom display of the manuscript page 2203 at the input zoom ratio.

Reference numeral 2202*a* and 2202*b* denote cursors which can be operated to the right and left in the preview area 2201. The user can move the cursors 2202*a* and 2202*b* to arbitrary positions to designate the backstrip range on the manuscript page 2203. In other words, the front cover part, backstrip part, and back cover part of the manuscript page 2203 can be defined by designating the positions of the cursors 2202*a* and 2202*b*.

Note that the display positions (backstrip range positions) of the cursors 2202*a* and 2202*b* are set at arbitrary positions (e.g., near the center) in the preview area 2201 in the initial state (state when the division position designation window is displayed by operating the division position designation portion 2005). Alternatively, display positions (backstrip range positions) defined by the cursors 2202*a* and 2202*b* may be set on the basis of the document information 401 and the backstrip alignment position selected by the position selection portion 2003.

In this fashion, the user can designate the front cover part, backstrip part, and back cover part by designating the backstrip range on a manuscript page via the division position designation window 2200. By using the bookbinding attribute setting window 2000 and division position designation window 2200, the user can designate the backstrip range and define the front Cover part, backstrip part, and back cover part in a manuscript page for which no front cover part, backstrip part, or back cover part is defined. As a result, the user can print a manuscript page in which the designated backstrip range position and designated backstrip alignment position are aligned to each other.

A manuscript print position calculation process of calculating the print position of a manuscript page on the basis of the operation in the position designation window 2100 (FIG.

Figure 12:
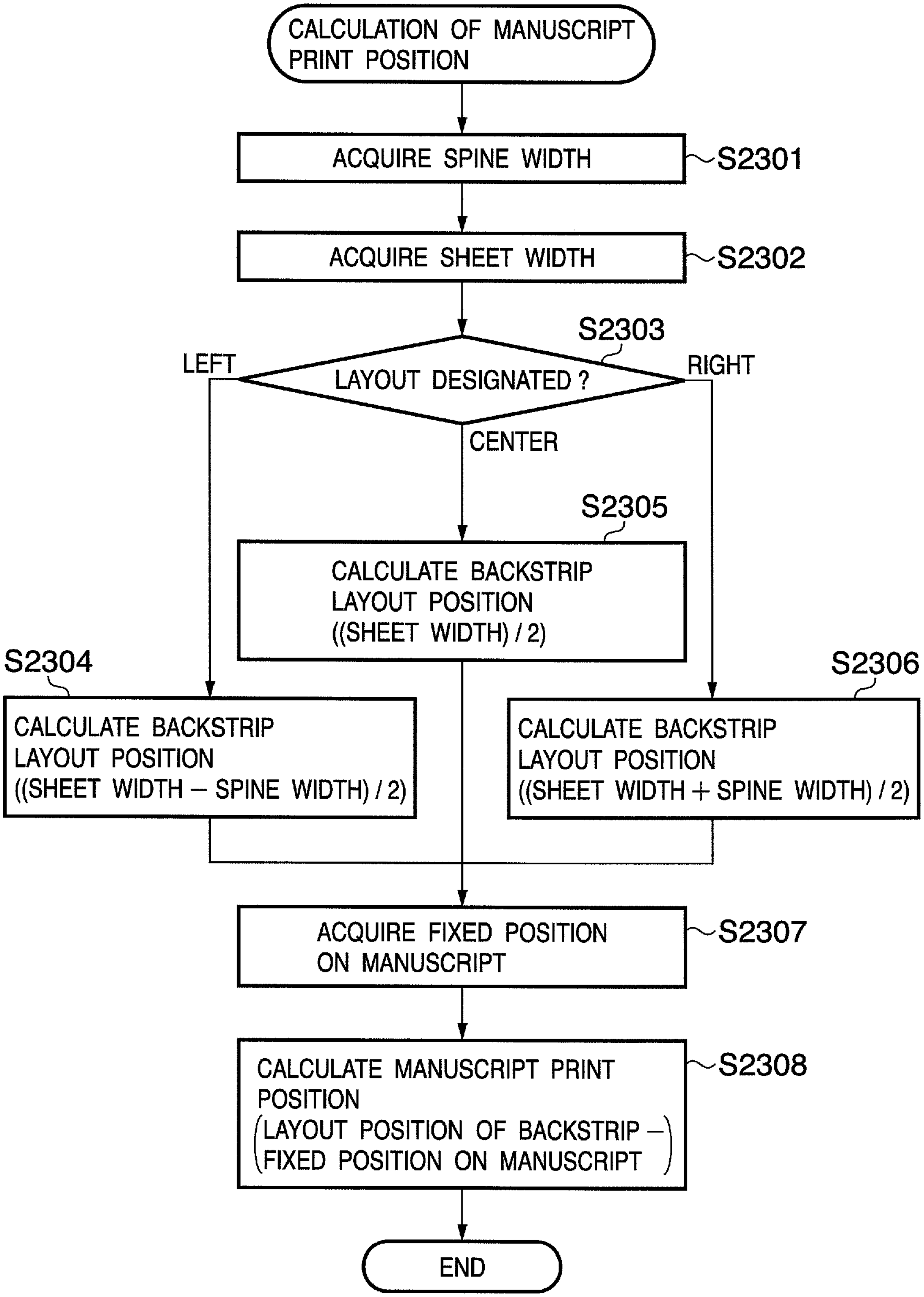
FIG. 12 is a flowchart showing a manuscript print position calculation process according to the embodiment of the present invention.

10) will be explained with reference to FIG. 12. Note that the manuscript print position calculation process in FIG. 12 is executed when the front covers backstrip, and back cover are defined for a cover manuscript page. Each calculation expression corresponds to a process when the opening direction of bookbinding is left opening.

FIG. 12 is a flowchart showing the manuscript print position calculation process by the bookbinding application 104 according to the embodiment of the present invention. This process is executed by the CPU 201 on the basis of the control program of the bookbinding application 104.

In step S2301, the bookbinding application 104 calculates the spine width (backstrip width) from the number of manuscript pages of the electronic manuscript file 103 and the type of print sheet, and acquires the calculated spine width.

In step S2302, the bookbinding application 104 acquires the sheet width (print sheet) for printing a front cover, backstrip, and back cover. The cover sheet has a sheet size (e.g., "A3 wide") capable of assigning a front cover, backstrip, and back cover of the manuscript size and cutting the cover sheet in a case binding process. The sheet size is determined in advance.

Generally in case binding, even if the size of the manuscript page is A4 size, a manuscript page is reduced to 90% to impose (lay out) the image in an area size smaller than A4 and print it, in order to cut a folded printed material at three edges by the cutting unit, as described with reference to FIGS. 1C and 2A to 2G. When a 1-edge cutting process of cutting only an edge opposite to the backstrip is performed in case binding printing, a manuscript page may be printed at a sheet size (e.g., A3 wide) without reducing the manuscript page.

In step S2303, the bookbinding application 104 determines the backstrip alignment position designated at the position selection portion 2003.

If the designated backstrip alignment position is the left in step S2303, the bookbinding application 104 calculates a backstrip layout position in step S2304 by a calculation expression ((sheet width−spine width)/2) using the acquired spine width and sheet width. The calculated backstrip layout position is set to the left folding line on which a cover sheet is folded, as described with reference to FIGS. 1C and 2A to 2G.

If the designated backstrip alignment position is the center in step S2303, the bookbinding application 104 calculates a backstrip layout position in step S2305 by a calculation expression ((sheet width)/2) using the sheet width. The calculated backstrip layout position is set to the center between the left and right folding lines on which a cover sheet is folded, as described with reference to FIGS. 1C and 2A to 2G.

If the designated backstrip alignment position is the right in step S2303, the bookbinding application 104 calculates a backstrip layout position in step S2306 by a calculation expression ((sheet width+spine width)/2) using the acquired spine width and sheet width. The calculated backstrip layout position is set to the right folding line on which a cover sheet is folded, as described with reference to FIGS. 1C and 2A to 2G.

The bookbinding application 104 stores the backstrip layout position calculated in one of steps S2304 to S2306 in the backstrip position attribute of the book attributes (document setting information 403) in FIGS. 4A and 4B.

The bookbinding application 104 can lay out a manuscript page by combining the backstrip layout position calculated in one of steps S2304 to S2306 and the fixed layout position of the backstrip of the manuscript page. For this purpose, the bookbinding application 104 calculates as follows the position (manuscript print position) where a cover manuscript page for which the front cover, backstrip, and back cover are defined is laid out on a cover print sheet.

In step S2307, the bookbinding application 104 acquires the fixed layout position of the backstrip on the manuscript page that is designated at the position designation portion 2004. In step S2308, the bookbinding application 104 executes a calculation expression using the calculation result obtained from one of steps S2304 to S2306 and the acquired fixed layout position of the backstrip. The fixed layout position of the backstrip represents a fixed position on the manuscript, and the calculation expression represents the backstrip layout position—a fixed position on the manuscript.

Then, the bookbinding application 104 calculates a manuscript print position (the print position of a cover manuscript page). The calculated manuscript print position represents the moving amount when the cover manuscript page is laid out on a cover print sheet. More specifically, the moving amount in layout is calculated by subtracting, from the backstrip layout position calculated in one of steps S2304 to S2306, the fixed backstrip layout position to be adjusted to the backstrip layout position.

The bookbinding application 104 stores the manuscript print position calculated in step S2308 in the front cover/backstrip/back cover position attribute of the book attributes (document setting information 403) in FIGS. 4A and 4B.

The spine width acquired in step S2301 can be obtained by adding the sheet thicknesses of all body pages upon designation of the number of body sheets and the sheet type for use that are obtained from the document information 401. The sheet width acquired in step S2302 may be a predetermined value stored in the document information 401. Alternatively, the result of inquiring the sheet width of a sheet for use of the printer 107 upon designation of a sheet for use that is obtained from the document information 401 can be used.

When the opening direction of bookbinding is right opening, the bookbinding application 104 executes the calculation expression ((sheet width+spine width)/2) in step S2304 and the calculation expression ((sheet width−spine width)/2) in step S2306.

The manuscript position calculation process in FIG. 12 is executed when the front cover, backstrip, and back cover are defined for a cover manuscript page. When no front cover, backstrip, or back cover is defined for a cover manuscript page, only the backstrip layout position is calculated.

A method of calculating the layout positions of the front and back covers when no front cover, backstrip, or back cover is defined for a cover manuscript page will be explained. That is, a print position calculation process of calculating the print positions of the front cover part, backstrip part, and back cover part in a manuscript page on the basis of an operation in the division position designation window 2200 (FIG. 11) will be described.

The print position calculation process of calculating the layout position (print position) of a backstrip part designated in a manuscript page, on the basis of an operation in the division position designation window 2200 is executed with reference to FIG. 12 (steps S2304 to S2306).

A front cover print position calculation process of calculating the print position of a front cover part designated in a manuscript page will be described with reference to FIG. 13A.

Figure 13A:
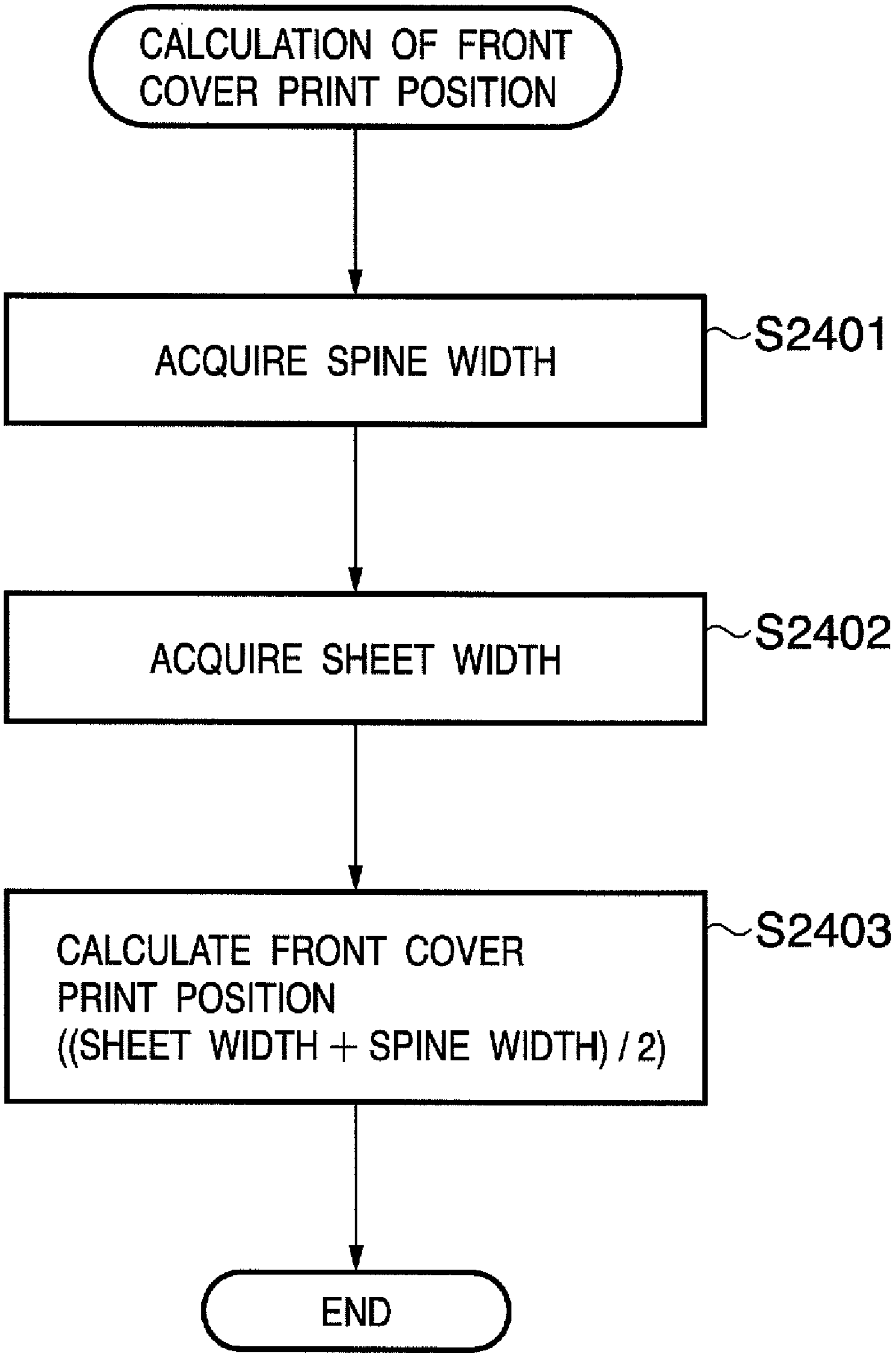
FIG. 13A is a flowchart showing a front cover print position calculation process according to the embodiment of the present invention.

FIG. 13A is a flowchart showing the front cover print position calculation process according to the embodiment of the present invention. The calculation expression in FIG. 13A corresponds to a process when the opening direction of bookbinding is left opening.

In step S2401, the bookbinding application 104 acquires a separately calculated spine width (backstrip width). In step S2402, the bookbinding application 104 acquires a separately acquired sheet width.

In step S2403, the bookbinding application 104 calculates a front cover layout position (print position) by a calculation expression ((sheet width+spine width)/2) using the acquired spine width and front cover sheet width. The calculated front cover layout position is set to the right folding line on which a cover sheet is folded, as described with reference to FIGS. 1C and 2A to 2G.

The bookbinding application 104 adjusts, to the front cover layout position calculated in step S2403, the front cover division position designated at the cursor 2202*a* of the manuscript page that is input via the division position designation window in FIG. 11.

The bookbinding application 104 stores the front cover layout position calculated in step S2403 in the front cover position attribute of the book attributes (document setting information 403) in FIGS. 4A and 4B.

A back cover print position calculation process of calculating the print position of a back cover part designated in a manuscript page will be described with reference to FIG. 13B.

Figure 13B:
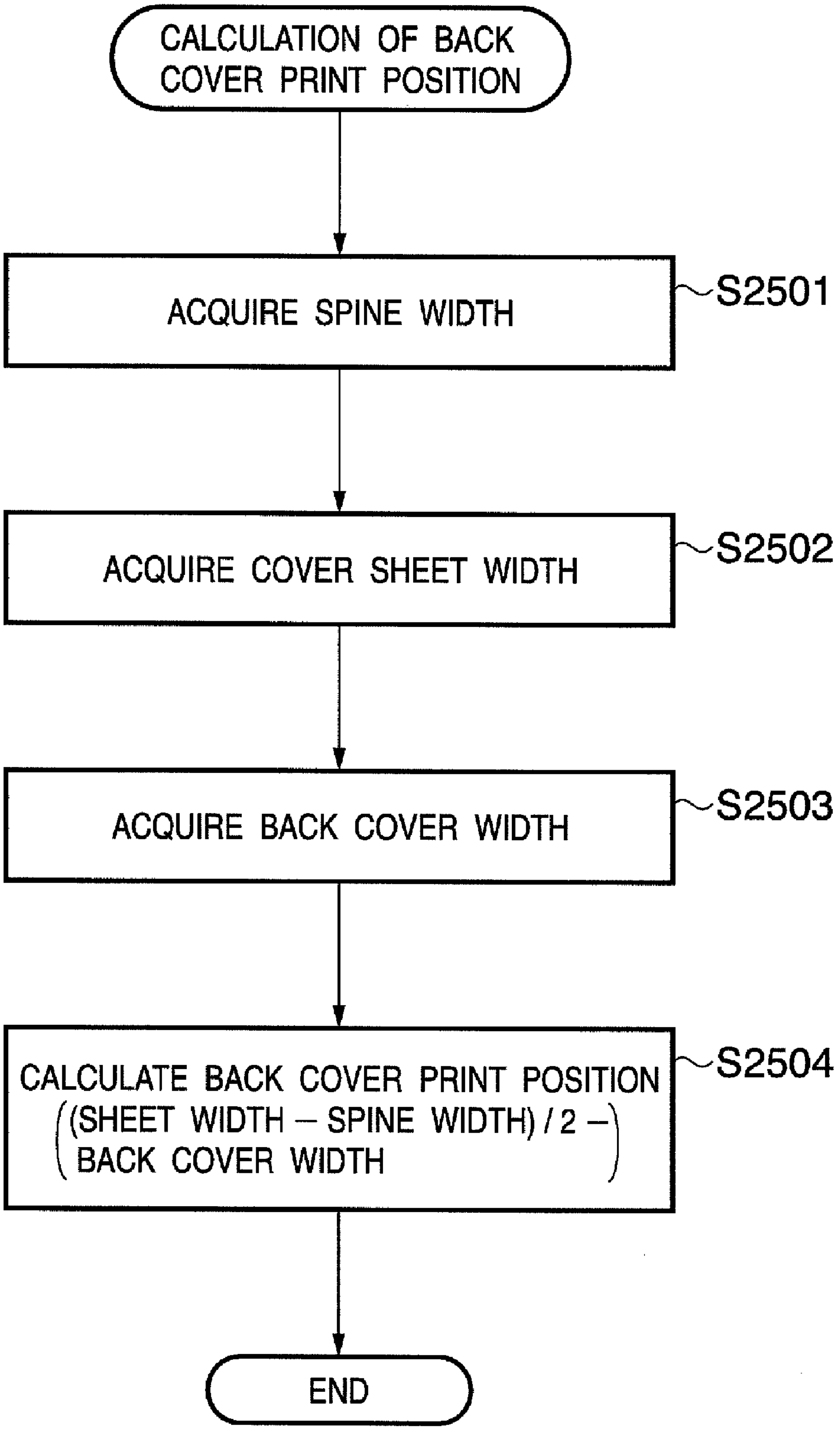
FIG. 13B is a flowchart showing a back cover print position calculation process according to the embodiment of the present invention.

FIG. 13B is a flowchart showing the back cover print position calculation process according to the embodiment of the present invention. The calculation expression in FIG. 13B corresponds to a process when the opening direction of bookbinding is left opening.

In step S2501, the bookbinding application 104 acquires a separately calculated spine width (backstrip width). In step S2502, the bookbinding application 104 acquires a separately acquired sheet width. In step S2503, the bookbinding application 104 acquires a separately acquired back cover width.

In step S2504, the bookbinding application 104 calculates a back cover layout position (print position) by a calculation expression ((sheet width−spine width)/2−back cover width) using the acquired spine width, sheet width, and back cover width. The calculated back cover layout position is obtained by subtracting the back cover sheet width from the left folding line on which a cover sheet is folded, as described with reference to FIGS. 1C and 2A to 2G.

The bookbinding application 104 adjusts the left side of the back cover of a manuscript page to the back cover layout position calculated in step S2504.

The bookbinding application 104 stores the back cover layout position calculated in step S2504 in the back cover position attribute of the book attributes (document setting information 403) in FIGS. 4A and 4B.

When the opening direction of bookbinding is right opening in FIGS. 13A and 13B, the relationship between the front and back covers is reversed. In this case, a front cover layout position is calculated, as shown in FIG. 13B, and a back cover layout position is calculated, as shown in FIG. 13A.

In FIGS. 13A and 13B, predetermined values stored in the document information 401 may be used as the sheet width acquired in steps S2402 and S2502 and the back cover width acquired in step S2503. As for the sheet width, the result of inquiring the sheet width of a sheet for use of the printer 107 on the basis of designation of a sheet for use that is obtained from the document information 401 can also be adopted.

The print position calculation processes shown in FIGS. 12, 13A, and 13B have been described on the assumption of left opening in which manuscript pages are arranged in the order of the back cover, backstrip, and front cover for descriptive convenience. However, these print position calculation processes are not limited to this arrangement. In other words, the print position calculation processes can also be applied to manuscript pages of right opening. In this case, the print position calculation processes are reversed. When manuscript pages are set to horizontal opening, print positions in the horizontal direction are calculated. On the contrary, when manuscript pages are set to vertical opening, print positions in the vertical direction are calculated.

In this manner, the process in FIG. 12 can calculate a manuscript print position serving as a moving amount for making the backstrip layout position (reference position) and the fixed layout position (fixed position on a manuscript) designated by the user coincide with each other. A front cover manuscript page is moved by the manuscript print position (moving amount) from the left side to right side of a front cover print sheet, and is laid out (imposed). Consequently, a folding process can be executed along a side at the fixed layout position designated by the user.

In FIGS. 13A and 13B, the print positions of the front cover, backstrip, and back cover are calculated because no front cover, backstrip, or back cover is defined for a manuscript page. The calculated front cover print position corresponds to the distance from the left side of a cover print sheet to the left side of the front cover, whereas the calculated back cover print position corresponds to the distance from the left side of the cover print sheet to the left side of the back cover. The backstrip print position (value calculated in one of steps S2304 to S2306 in FIG. 12) corresponds to the distance from the left side of the cover print sheet to the fixed layout position of the backstrip.

Hence, the bookbinding application 104 can accurately lay out (impose) the cover manuscript page on the cover print sheet on the basis of the front cover print position, the backstrip print position, the back cover print position, and the division positions designated in FIG. 11.

An imposition process in printing on the basis of a print position calculated by the position calculation process will be explained with reference to FIG. 14.

Figure 14:
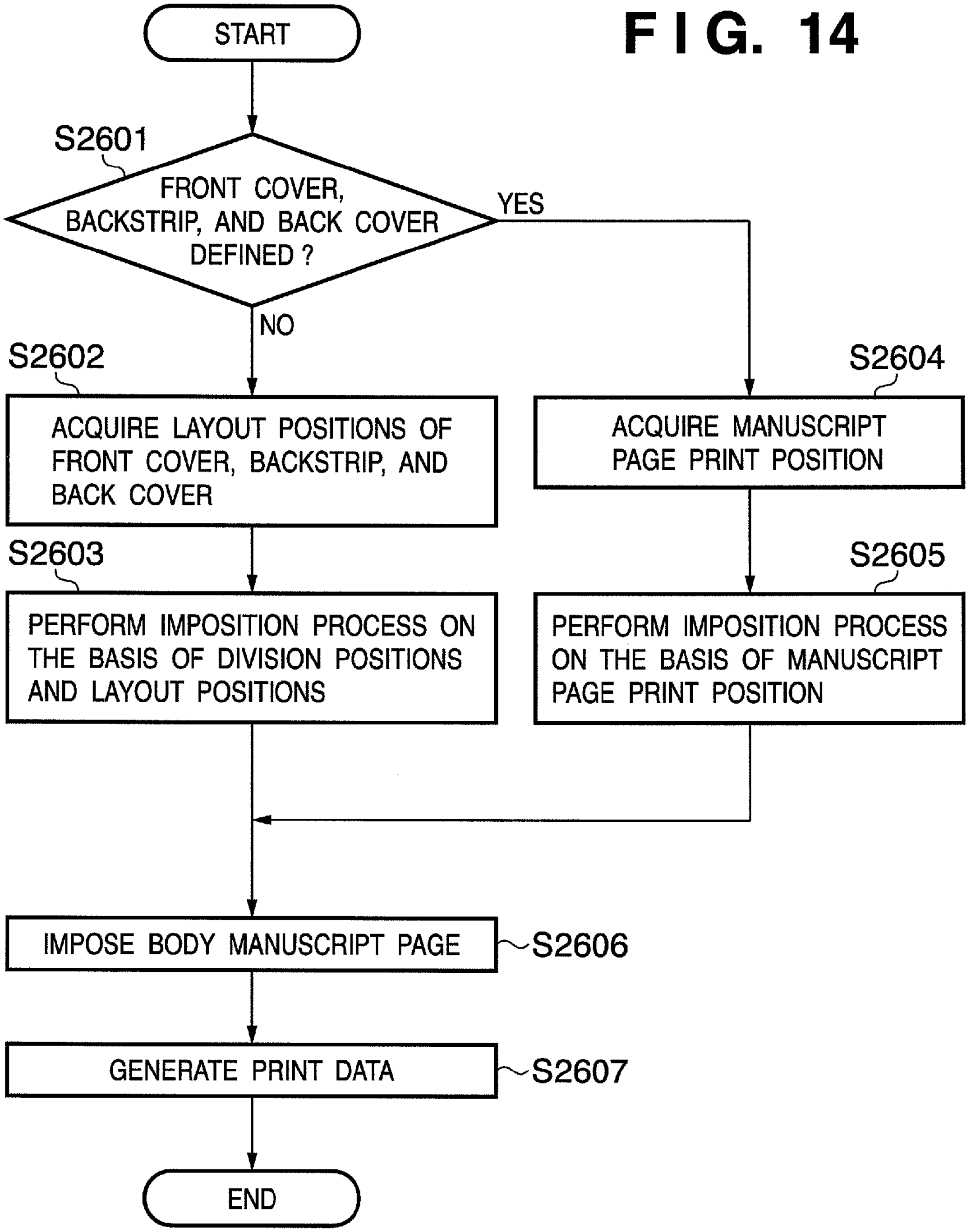
FIG. 14 is a flowchart showing an imposition process according to the embodiment of the present invention.

FIG. 14 is a flowchart showing the imposition process according to the embodiment of the present invention. In this process, a process until the electronic manuscript de-spooler 105 performs imposition control on the basis of the layout position determined by the bookbinding application 104 and the printer driver 106 generates print data will be explained. This process starts in the bookbinding application 104 when the user designates printing.

In step S2601, in order to impose a cover manuscript page, the bookbinding application 104 determines whether the front cover, backstrip, and back cover are defined for a cover manuscript page.

If the bookbinding application 104 determines that no front cover, backstrip, or back cover is defined (NO in step S2601), it acquires the layout positions of the front cover, backstrip, and back cover that are calculated in FIGS. 12 to 14, from their position attributes of the book attributes in step S2602.

In step S2603, the electronic manuscript de-spooler 105 is activated by the bookbinding application 104, and performs an imposition process on the basis of the layout positions of the backstrip, front cover, and back cover and the division positions in FIG. 11. The layout positions of the backstrip, front cover, and back cover are represented by distances from the left side of the cover print sheet serving as a reference. In accordance with the distances designated by the respective layout positions, the electronic manuscript de-spooler 105 calculates the coordinates of cover manuscript page data read out from an electronic manuscript file. The electronic manuscript de-spooler 105 generates drawing data of the calculated coordinates, and outputs the drawing data to the printer driver 106.

If the bookbinding application 104 determines that the front cover, backstrip, and back cover are defined for a cover manuscript page (YES in step S2601, the process shifts to step S2604. In step S2604, the bookbinding application 104 acquires a manuscript page print position calculated in FIG. 12 from the position attribute of the book attributes.

In step S2605, the electronic manuscript de-spooler 105 is activated by the bookbinding application 104, and imposes a cover manuscript page on the basis of the manuscript page print position (layout position). As described in the process of FIG. 12, the print position of the cover manuscript page represents the moving amount when the cover manuscript page is laid out on a cover print sheet. Hence, the electronic manuscript de-spooler 105 moves the coordinates by the moving amount to generate cover drawing data and output it to the printer driver 106.

In step S2606, the electronic manuscript de-spooler 105 reads out a body manuscript page from the electronic manuscript file, generates drawing data in accordance with the body sheet size, and outputs the drawing data to the printer driver 106.

In step S2607, the printer driver 106 generates print data interpretable by the printer 107 on the basis of the cover drawing data and body drawing data which are output from the electronic manuscript de-spooler 105. The generated print data is transmitted to the printer 107 via the PRTC 20B.

Note that print sheets of different sizes are designated for body print data and cover print data. In the printing apparatus (FIG. 1C) having the bookbinding apparatus in the embodiment, as described above, body print data are printed first and printed sheets are stacked on the stacking portion 7236. Then, cover print data is printed on a cover sheet, and the case binding process is executed.

Print results obtained by the print position calculation process (FIGS. 12, 13A, and 13B) and the imposition process (FIG. 14), and a concrete example of a series of processes up to a finish obtained by binding print results will be explained with reference to FIGS. 15A to 17C.

Figure 15A:
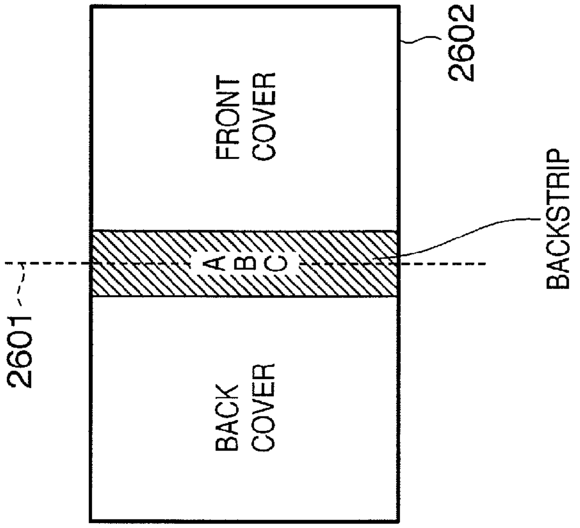
FIGS. 15A to 15C are views showing an example of a print result when the fixed layout position designation and backstrip alignment position are set to the center according to the embodiment of the present invention.
Figure 15B:
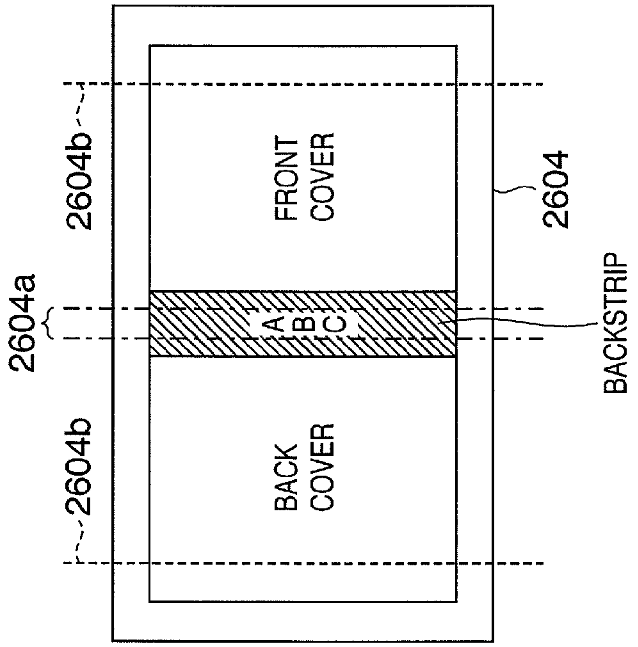
Figure 15C:
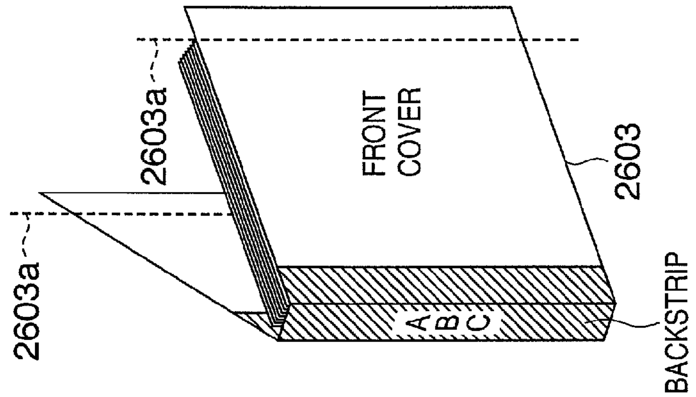

FIGS. 15A to 15C are views showing an example of a print result when the fixed layout position designation and backstrip alignment position are set to the center according to the embodiment of the present invention.

FIG. 15A shows a display example of the preview area 2101 in the position designation window 2100. In FIG. 15A, while “center” is designated as the backstrip alignment position at the position selection portion 2003 in the bookbinding attribute setting window 2000, a fixed layout position 2601 of the backstrip indicated by the dotted line is designated in a manuscript page 2602 in the preview area 2101 of the position designation window 2100.

In this case, the bookbinding application 104 determines the print position of the manuscript page so as to print the backstrip at a backstrip position 2604*a* in a print result 2604 shown in FIG. 15B. The backstrip position 2604*a* and a cutting position 2604*b* are illustrated to explain a position where the cover sheet is folded (bound) by the printer 107 or bookbinding apparatus (FIG. 1C) to form a backstrip. The backstrip position 2604*a* and cutting position 2604*b* are not printed in practice. As described above, the sheet size of the print result 2604 is set large (e.g., A4 wide) because the sheet has a manuscript page portion and cutting portion.

The width of the backstrip position 2604*a* is calculated in step S2301, and this position represents a range (backstrip range) serving as an actual backstrip.

FIG. 15C conceptually shows a finishing result 2603 of printed materials folded (bound) by the printer 107 or bookbinding apparatus (FIG. 1C). In this case, the fixed layout position of the backstrip is arranged at the center of the backstrip.

Figures 16A, 16B, 16C:
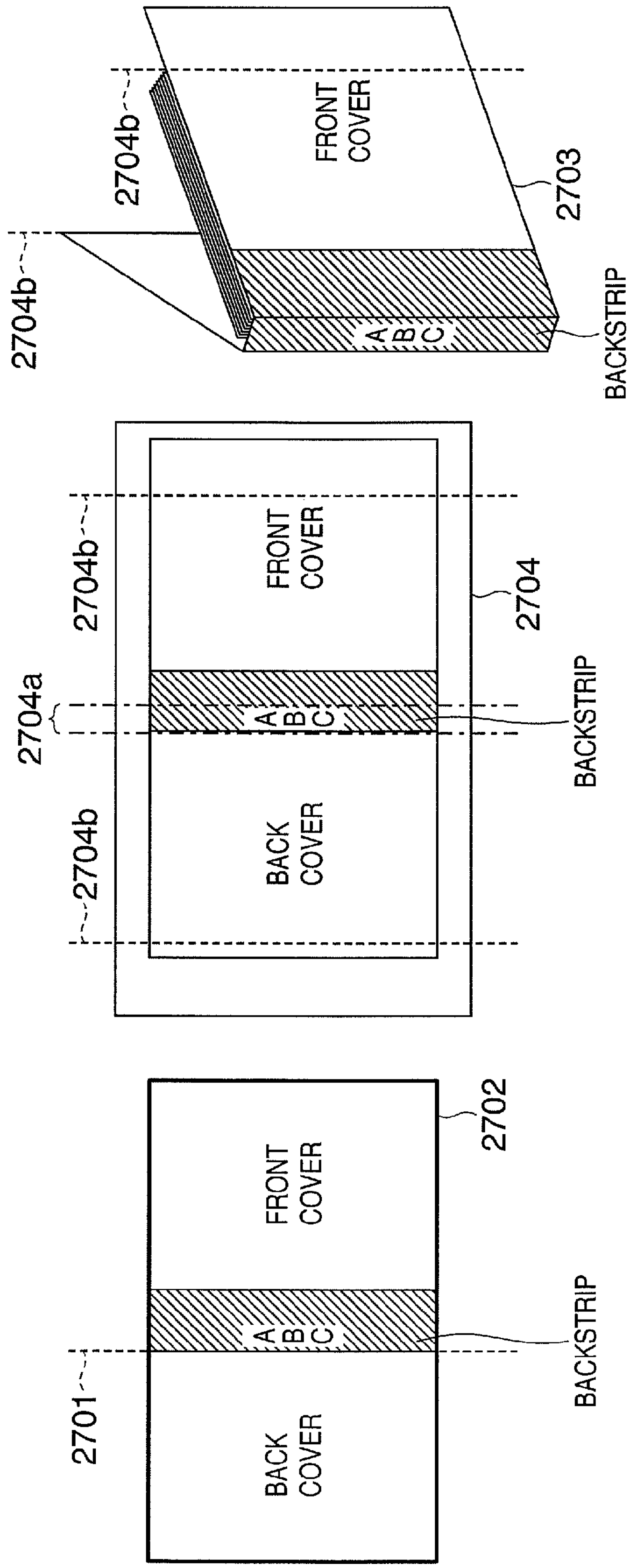
FIGS. 16A to 16C are views showing an example of a print result when the fixed layout position designation and backstrip alignment position are set to the left according to the embodiment of the present invention.

FIGS. 16A to 16C are views showing an example of a print result when the fixed layout position designation and backstrip alignment position are set to the left according to the embodiment of the present invention.

FIG. 16A shows a display example of the preview area 2101 in the position designation window 2100. In FIG. 16A, while “left” is designated as the backstrip alignment position at the position selection portion 2003 in the bookbinding attribute setting window 2000, a fixed layout position 2701 of the backstrip indicated by the dotted line is designated in a manuscript page 2702 in the preview area 2101 of the position designation window 2100.

In this case, the bookbinding application 104 determines the print position of the manuscript page so as to print the backstrip at a backstrip position 2704*a* in a print result 2704 shown in FIG. 16B. The backstrip position 2704*a* and a cutting position 2704*b* are illustrated to explain a position where the cover sheet is folded (bound) by the printer 107 or bookbinding apparatus (FIG. 1C) to form a backstrip. The backstrip position 2704*a* and cutting position 2704*b* are not printed in practice.

FIG. 16C conceptually shows a finishing result 2703 of printed materials folded (bound) by the printer 107 or bookbinding apparatus (FIG. 1C). In this case, the fixed layout position of the backstrip is arranged at the left side (left end) of the backstrip.

Figure 17C:
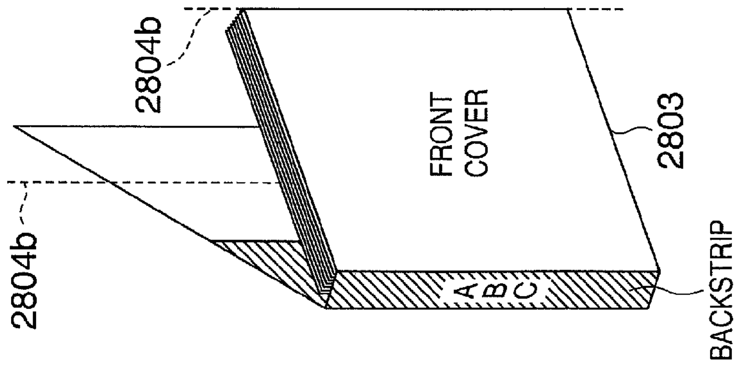
FIGS. 17A to 17C are views showing an example of a print result when the fixed layout position designation and backstrip alignment position are set to the right according to the embodiment of the present invention.
Figure 17B:
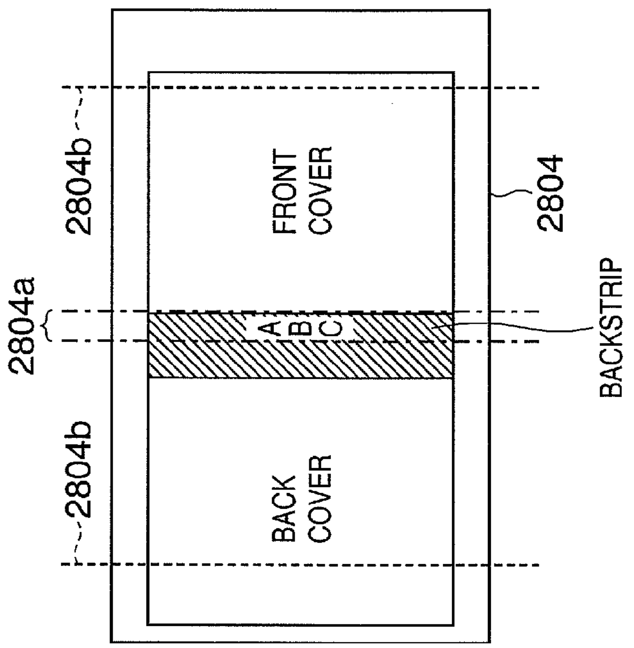
Figure 17A:
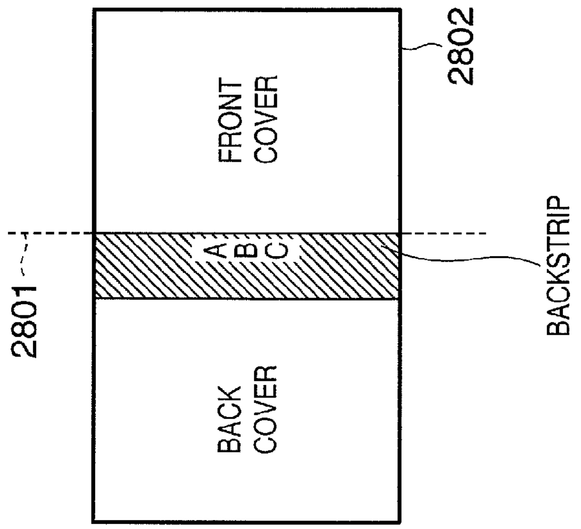

FIGS. 17A to 17C are views showing an example of a print result when the fixed layout position designation and backstrip alignment position are set to the right according to the embodiment of the present invention.

FIG. 17A shows a display example of the preview area 2101 in the position designation window 2100. In FIG. 17A, while “right” is designated as the backstrip alignment position at the position selection portion 2003 in the bookbinding attribute setting window 2000, a fixed layout position 2801 of the backstrip indicated by the dotted line is designated in a manuscript page 2802 in the preview area 2101 of the position designation window 2100.

In this case, the bookbinding application 104 determines the print position of the manuscript page so as to print the backstrip at a backstrip position 2804*a* in a print result 2804 shown in FIG. 17B. The backstrip position 2804*a* and a cutting position 2804*b* are illustrated to explain a position where the cover sheet is folded (bound) by the printer 107 or bookbinding apparatus (FIG. 1C) to form a backstrip. The backstrip position 2804*a* and cutting position 2804*b* are not printed in practice.

FIG. 17C conceptually shows a finishing result 2803 of printed materials folded (bound) by the printer 107 or bookbinding apparatus (FIG. 1C). In this case, the fixed layout position of the backstrip is arranged at the right side (right end) of the backstrip.

An operation based on the division position designation window 2200 (FIG. 11), print results obtained by the print position calculation process based on the operation, and a concrete example of a series of processes up to a finish obtained by binding print results will be explained with reference to FIGS. 18A to 20C.

Figure 18C:
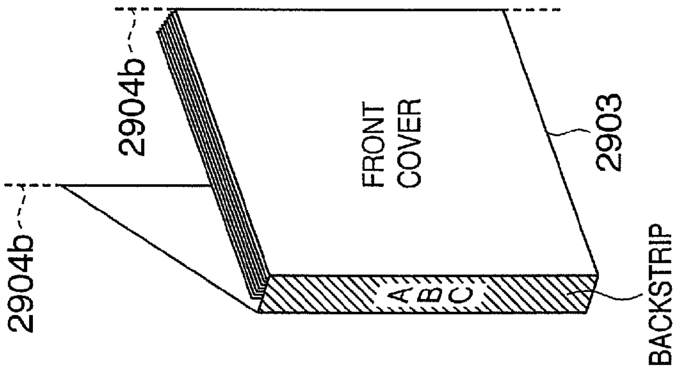
FIGS. 18A to 18C are views showing an example of a print result when the fixed layout position designation, backstrip alignment position (center), and backstrip range designation are set according to the embodiment of the present invention.
Figure 18B:
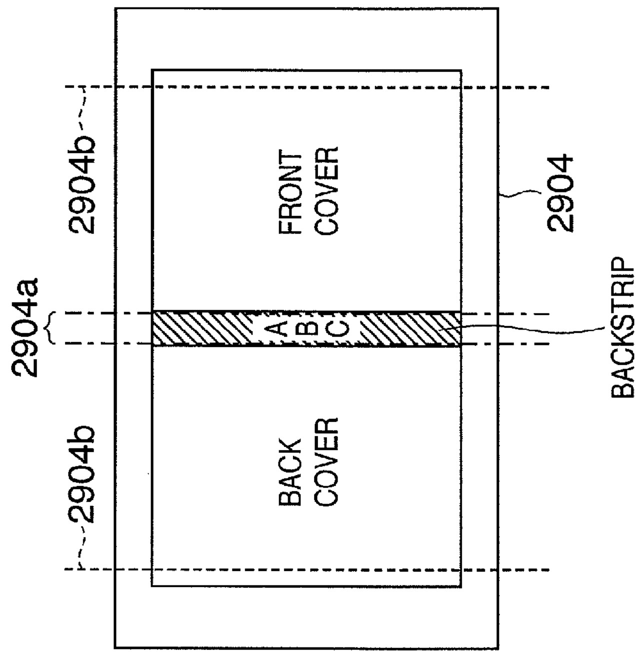
Figure 18A:
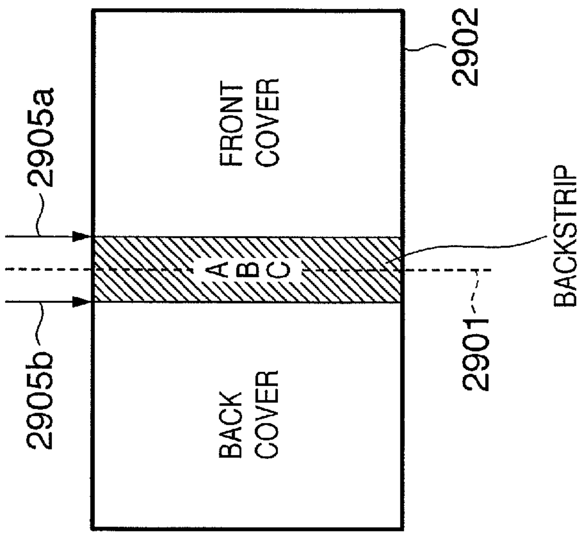

FIGS. 18A to 18C are views showing an example of a print result when the fixed layout position designation, backstrip alignment position (center), and backstrip range designation are set according to the embodiment of the present invention.

FIG. 18A shows a display example of the preview area 2201 in the division position designation window 2200. In FIG. 18A, while "center" is designated as the backstrip alignment position at the position selection portion 2003 in the bookbinding attribute setting window 2000, a fixed layout position 2901 of the backstrip indicated by the dotted line is designated in a manuscript page 2902 in the preview area 2201 of the division position designation window 2200. Division positions 2905*a* and 2905*b* at which the cover sheet is divided into a back cover, backstrip, and front cover are designated as the backstrip range.

In this case, the bookbinding application 104 determines the print position of the manuscript page so as to print the backstrip at a backstrip position 2904*a* in a print result 2904 shown in FIG. 18B. More specifically, the print positions of the front and back cover parts are determined such that the positions of the front and back cover parts adjacent to the backstrip part are adjacent to the backstrip position 2904*a*.

Note that the backstrip position 2904*a* and a cutting position 2904*b* are illustrated to explain a position where the cover sheet is folded (bound) by the printer 107 or bookbinding apparatus (FIG. 1C) to form a backstrip. The backstrip position 2904*a* and cutting position 2904*b* are not printed in practice.

FIG. 18C conceptually shows a finishing result 2903 of printed materials folded (bound) by the printer 107 or bookbinding apparatus (FIG. 1C). In this case, the fixed layout position of the backstrip is arranged at the center of the backstrip. The front cover part on the right side of the division position 2905*a* and the back cover part on the left side of the division position 2905*b* are arranged at positions adjacent to the backstrip.

As described above, the width of the backstrip position 2904*a* represents an actual backstrip range serving as an actual backstrip on the basis of the calculation in step S2301. To the contrary, the division positions 2905*a* and 2905*b* represent a virtual backstrip range explicitly designated by the user. The actual backstrip range and virtual backstrip range do not always coincide with each other.

In the embodiment, in order to position the front and back cover parts adjacent to the backstrip part, different layer images are defined between the backstrip part and the front and back cover parts. The backstrip part is defined as a lower layer image, whereas the front and back cover parts are defined as upper layer images. The positional relationship between the backstrip part and the front and back cover parts is controlled to determine the print positions of the respective parts. In this case, the print positions of the front and back cover parts are determined such that the backstrip part falls within the actual backstrip range.

The print position is determined in the following three cases.

1) Actual Backstrip Range<Virtual Backstrip Range

In this case, the actual backstrip range is narrower than the virtual backstrip range defined by the user. In bookbinding, the backstrip part in the actual backstrip range suffices to be formed on a sheet. Thus, the bookbinding application 104 lays out the virtual backstrip range at a designated backstrip alignment position on a manuscript page.

In order to form the actual backstrip range from the virtual backstrip range, the bookbinding application 104 superposes the front and back cover parts at a position corresponding to the actual backstrip range in the virtual backstrip range. In other words, the bookbinding application 104 superposes the front and back cover parts at a position corresponding to the actual backstrip range in the front plane (upper layer) of the virtual backstrip range.

Consequently, the print positions are determined such that the backstrip part, front cover part, and back cover part are adjacent to each other.

2) Actual Backstrip Range=Virtual Backstrip Range

In this case, since the virtual backstrip range defined by the user and the actual backstrip range coincide with each other, the bookbinding application 104 lays out the virtual backstrip range at a designated backstrip alignment position on a manuscript page. After that, the bookbinding application 104 lays out the front and back cover parts at the two ends of the virtual backstrip range so as to be adjacent to the backstrip part.

Accordingly, the print positions are determined such that the backstrip part, front cover part, and back cover part are adjacent to each other.

3) Actual Backstrip Range>Virtual Backstrip Range

In this case, the actual backstrip range is wider than the virtual backstrip range defined by the user. In bookbinding, the backstrip part in the actual backstrip range must be formed on a sheet. Thus, the bookbinding application 104 lays out the virtual backstrip range at a designated backstrip alignment position on a manuscript page. Then, the bookbinding application 104 lays out the front and back cover parts at the two ends of the actual backstrip range (containing the virtual backstrip range) in order to ensure the actual backstrip range.

Figures 20A, 20B, 20C:
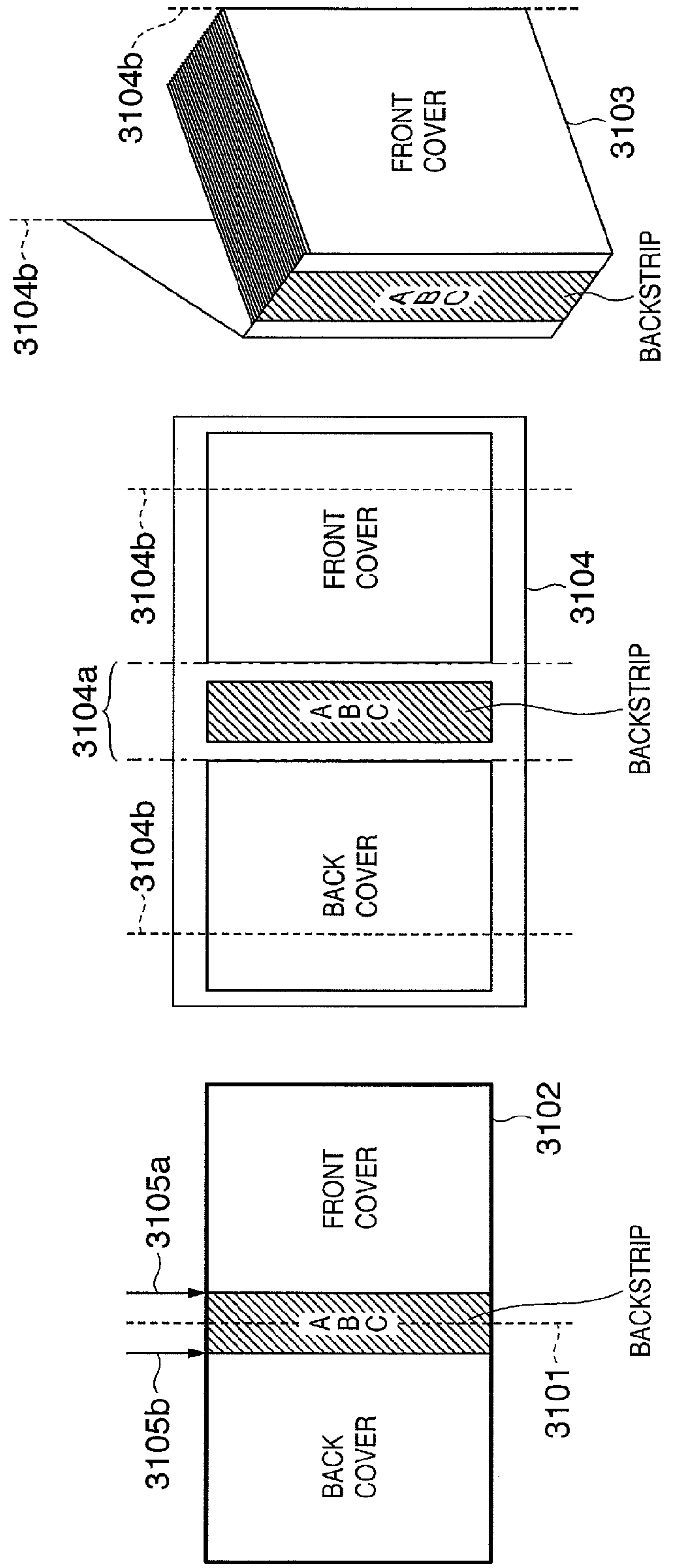
FIGS. 20A to 20C are views showing an example of a print result when the fixed layout position designation, backstrip alignment position (center), and backstrip range designation are set according to the embodiment of the present invention.

As a result, the print positions are determined such that the actual backstrip range, front cover part, and back cover part are adjacent to each other. In this case, the actual backstrip range, front cover part, and back cover part are laid out adjacent to each other so as to ensure the actual backstrip range. For this reason, as shown in FIGS. 20A to 20C to be described later, margins (gaps) are generated between the front and back cover parts and the backstrip part in the virtual backstrip range defined by the user in the actual backstrip range.

Figure 19C:
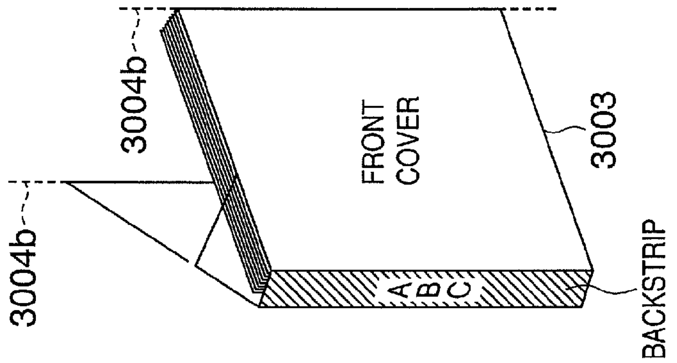
FIGS. 19A to 19C are views showing an example of a print result when the fixed layout position designation, backstrip alignment position (left), and backstrip range designation are set according to the embodiment of the present invention.
Figure 19B:
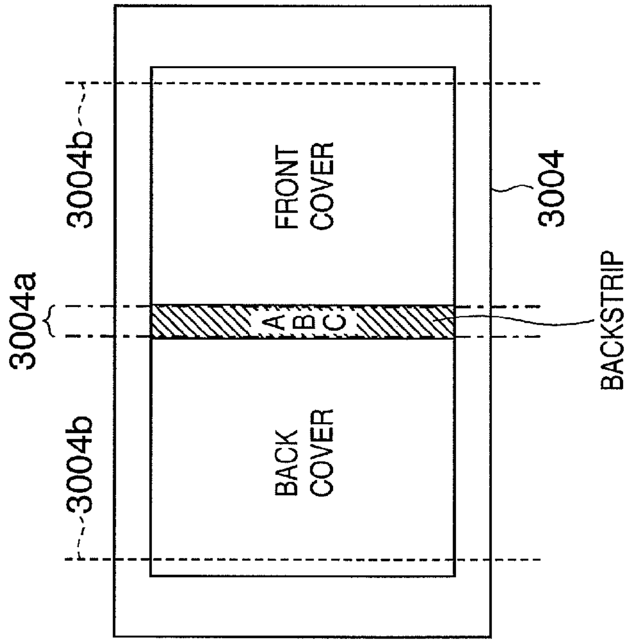
Figure 19A:
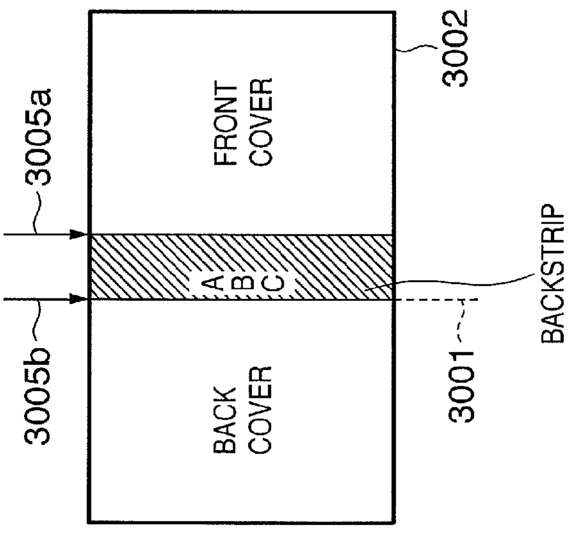

FIGS. 19A to 19C are views showing an example of a print result when the fixed layout position designation, backstrip alignment position (left), and backstrip range designation are set according to the embodiment of the present invention.

FIG. 19A shows a display example of the preview area 2201 in the division position designation window 2200. In FIG. 19A, while "left" is designated as the backstrip alignment position at the position selection portion 2003 in the bookbinding attribute setting window 2000, a fixed layout position 3001 of the backstrip indicated by the dotted line is designated in a manuscript page 3002 in the preview area 2201 of the division position designation window 2200. Division positions 3005*a* and 3005*b* at which the cover sheet is divided into a back cover, backstrip, and front cover are designated as the backstrip range.

In this case, the bookbinding application 104 determines the print position of the manuscript page so as to print the backstrip at a backstrip position 3004*a* in a print result 3004 shown in FIG. 19B. More specifically, the print positions of the front and back cover parts are determined such that the positions of the front and back cover parts adjacent to the backstrip part are adjacent to the backstrip position 3004*a*.

Note that the backstrip position 3004*a* and a cutting position 3004*b* are illustrated to explain a position where the cover sheet is folded (bound) by the printer 107 or bookbinding apparatus (FIG. 1C) to form a backstrip. The backstrip position 3004*a* and cutting position 3004*b* are not printed in practice.

FIG. 19C conceptually shows a finishing result 3003 of printed materials folded (bound) by the printer 107 or bookbinding apparatus (FIG. 1C). In this case, the fixed layout position of the backstrip is arranged on the left side (left end) of the backstrip. The front cover part on the right side of the division position 3005*a* and the back cover part on the left side of the division position 3005*b* are arranged at positions adjacent to the backstrip.

FIGS. 20A to 20C are views showing an example of a print result when the fixed layout position designation, backstrip alignment position (center), and backstrip range designation are set according to the embodiment of the present invention.

FIG. 20A shows a display example of the preview area 2201 in the division position designation window 2200. In FIG. 20A, while "center" is designated as the backstrip alignment position at the position selection portion 2003 in the bookbinding attribute setting window 2000, a fixed layout position 3101 of the backstrip indicated by the dotted line is designated in a manuscript page 3102 in the preview area 2201 of the division position designation window 2200. Division positions 3105*a* and 3105*b* at which the cover sheet is divided into a back cover, backstrip, and front cover are designated as the backstrip range.

In this case, the bookbinding application 104 determines the print position of the manuscript page so as to print the backstrip at a backstrip position 3104*a* in a print result 3104 shown in FIG. 20B. More specifically, the print positions of the front and back cover parts are determined such that the positions of the front and back cover parts adjacent to the backstrip part are adjacent to the backstrip position 3104*a*.

Note that the backstrip position 3104*a* and a cutting position 3104*b* are illustrated to explain a position where the cover sheet is folded (bound) by the printer 107 or bookbinding apparatus (FIG. 1C) to form a backstrip. The backstrip position 3104*a* and cutting position 3104*b* are not printed in practice.

FIG. 20C conceptually shows a finishing result 3103 of printed materials folded (bound) by the printer 107 or bookbinding apparatus (FIG. 1C). In this case, the fixed layout position of the backstrip is arranged at the center of the backstrip. The front cover part on the right side of the division position 3105*a* and the back cover part on the left side of the division position 3105*b* are arranged at positions adjacent to the backstrip.

In this case, since the backstrip part is narrower than the actual backstrip range (the backstrip part is short of the width for the actual backstrip range), gaps are generated between the front cover part and the backstrip part and between the back cover part and the backstrip part at the backstrip part in the print result 3104.

When gaps are generated between the front cover part and the backstrip part and between the back cover part and the backstrip part, as represented by the print result in FIG. 20B, the user may feel that the appearance of the finishing result is impaired. Thus, when a print result as shown in FIG. 20B is obtained, the manuscript of the backstrip part (virtual backstrip range) may be scaled (enlarged/reduced) in accordance with the actual backstrip width (actual backstrip range) as a post-process (print position recalculation process).

An example of the print result upon performing this post-process will be explained with reference to FIGS. 21A to 21C.

Figure 21A:
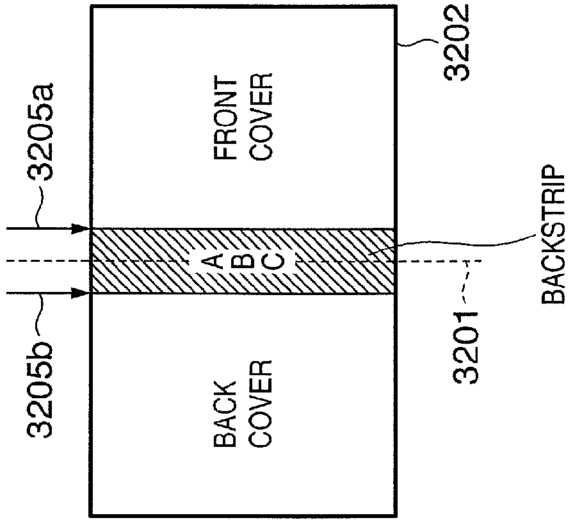
FIGS. 21A to 21C are views showing an application of the print result when the fixed layout position designation, backstrip alignment position (center), and backstrip range designation are set according to the embodiment of the present invention.
Figure 21B:
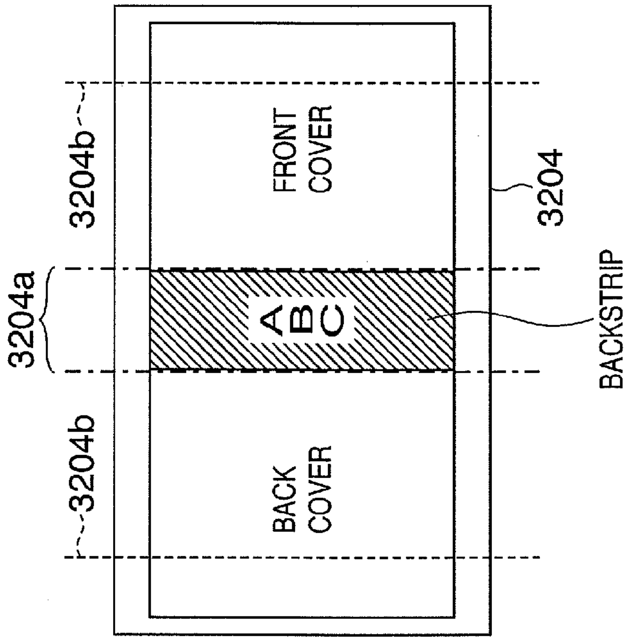
Figure 21C:
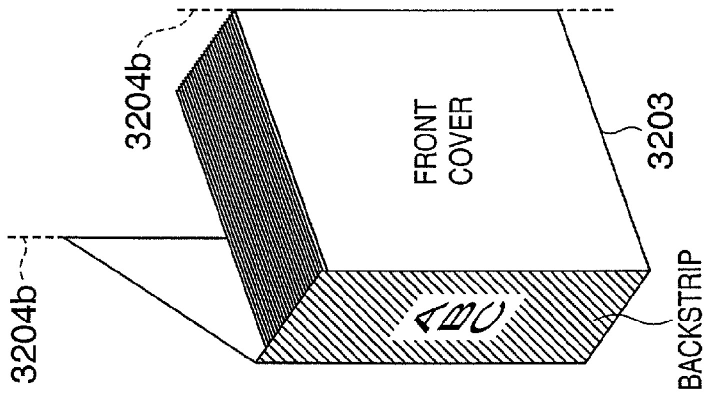

FIGS. 21A to 21C are views showing an application of the print result when the fixed layout position designation, backstrip alignment position (center), and backstrip range designation are set according to the embodiment of the present invention.

FIG. 21A shows the same designation state as that in FIG. 20A. That is, FIG. 21A shows a display example of the preview area 2201 in the division position designation window 2200. In FIG. 21A, while "center" is designated as the backstrip alignment position at the position selection portion 2003 in the bookbinding attribute setting window 2000, a fixed layout position 3201 of the backstrip indicated by the dotted line is designated in a manuscript page 3202 in the preview area 2201 of the division position designation window 2200. Division positions 3205*a* and 3205*b* at which the cover sheet is divided into a back cover, backstrip, and front cover are designated as the backstrip range.

When the state in FIG. 21A leads to the print result shown in FIG. 20B, the manuscript of the backstrip part must be enlarged in accordance with an actual backstrip position 3204*a*. An example of enlargement is shown in FIG. 21B.

As shown in FIG. 21C, the print result shown in FIG. 21A leads to a finishing result 3203 in which no gap is generated between the front cover part and the backstrip part and between the back cover part and the backstrip part, unlike the finishing result 3103 in FIG. 20C.

If the contents of the backstrip part exceed the actual backstrip width, in contrast to the finishing result 3103 shown in FIG. 21C, a post-process of reducing the manuscript page of the backstrip part so as to fall within the backstrip width is executed.

As another example of the post-process when a print result as shown in FIG. 20B is obtained, a process of painting gaps between the front cover part and the backstrip part and between the back cover part and the backstrip part in the same background color as that of the backstrip or in a predetermined color may be executed.

An example of the print result upon performing this post-process will be explained with reference to FIGS. 22A to 22C.

Figure 22C:
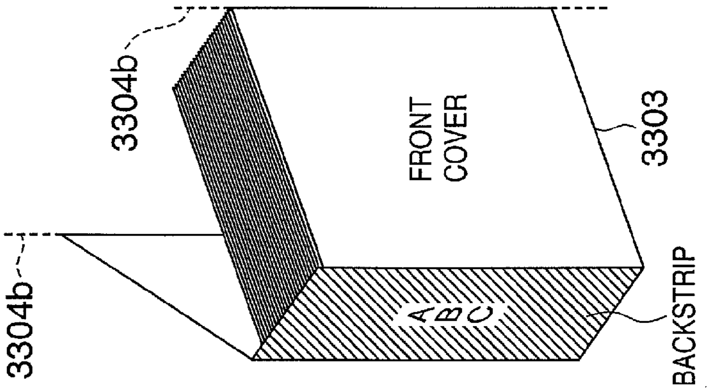
FIGS. 22A to 22C are views showing another application of the print result when the fixed layout position designation, backstrip alignment position (center), and backstrip range designation are set according to the embodiment of the present invention.
Figure 22B:
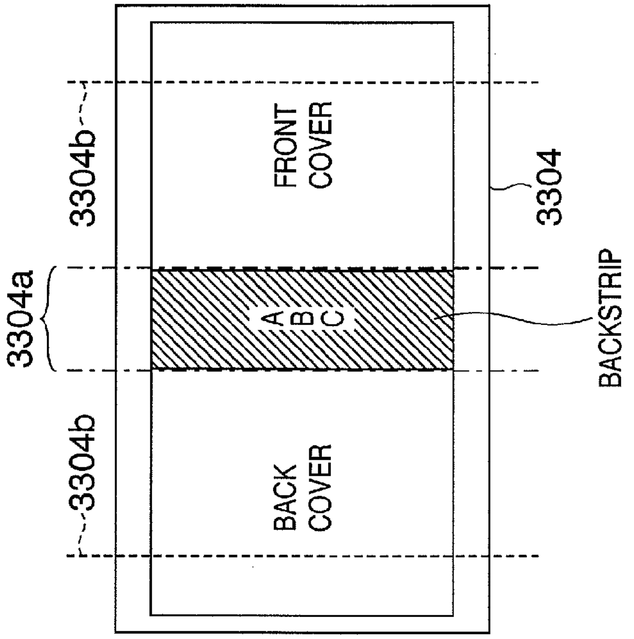
Figure 22A:
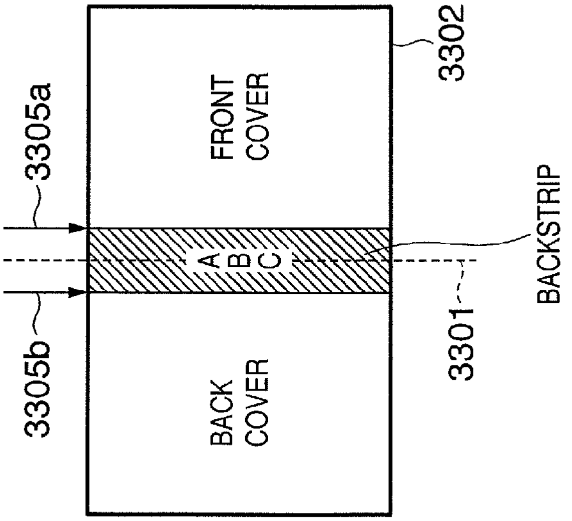

FIGS. 22A to 22C are views showing another application of the print result when the fixed layout position designation, backstrip alignment position (center), and backstrip range designation are set according to the embodiment of the present invention.

FIG. 22A shows the same designation state as that in FIG. 20A. That is, FIG. 22A shows a display example of the preview area 2201 in the division position designation window 2200. In FIG. 22A, while "center" is designated as the backstrip alignment position at the position selection portion 2003 in the bookbinding attribute setting window 2000, a fixed layout position 3301 of the backstrip indicated by the dotted line is designated in a manuscript page 3302 in the preview area 2201 of the division position designation window 2200. Division positions 3305*a* and 3305*b* at which the cover sheet is divided into a back cover, backstrip, and front cover are designated as the backstrip range.

When the state in FIG. 22A leads to the print result shown in FIG. 20B, the gaps between the front cover part and the backstrip part and between the back cover part and the backstrip part are painted in the same background color as that of the backstrip. An example of painting is shown in FIG. 22B.

As shown in FIG. 22C, the print result shown in FIG. 21B leads to a finishing result 3303 in which no gap is generated between the front cover part and the backstrip part and between the back cover part and the backstrip part, unlike the finishing result 3103 in FIG. 20C.

In the process of FIGS. 21A to 21C, the entire backstrip part is enlarged, and the internal image such as the character string is also enlarged. In contrast to this, in the process of FIGS. 22A to 22C, no entire backstrip part is enlarged, so no internal image such as the character string is enlarged. Instead, the background image of the backstrip part increases.

As still another application, a backstrip print position calculated when the fixed layout position of the backstrip is designated via the position designation window 2100 is compared with a backstrip position calculated on the basis of document information when no fixed layout position is designated. When the moving amount (difference) between the two positions is equal to or larger than a predetermined value on the basis of the comparison result, warning information (e.g., warning message (sound/image) or warning dialog) may be output.

In addition, the same comparison may be done between the print positions of the backstrip, front cover, and back cover that are calculated when the backstrip range is designated via the division position designation window 2200. Warning information may be output on the basis of the comparison result.

In this way, according to the embodiment, the backstrip alignment position (2003 in FIG. 9) representing the alignment position of the backstrip in manuscript page data with respect to the folding position of a print sheet is set. A print position where cover manuscript page data is printed on a print sheet is calculated on the basis of the backstrip alignment position (FIG. 12 or FIGS. 13A and 13B). This makes it possible to impose a cover manuscript page so as to match the folding position of a cover sheet.

As described above, according to the embodiment, in creating the print layout (print position) of the backstrip part in a manuscript page, the user only designates a backstrip alignment position on the manuscript page, completing adjustment of the print position. The print layout of the backstrip can be achieved in consideration of the backstrip width and the folding position of a sheet serving as the backstrip without manually adjusting the print position of the backstrip.

By designating the backstrip range serving as the backstrip in a manuscript page, the manuscript page can be divided into the front cover, backstrip, and back cover. The front and back covers can be automatically laid out adjacent to the two ends of the backstrip position. In designing the backstrip, no backstrip width need be considered. Hence, the manuscript can be designed without any limitation.

The spine width (backstrip width) is calculated from the type of sheet (size and sheet orientation) used for the body and the number of sheets in document information. When the spine width changes, the backstrip print position is calculated again. Even if the type of sheets used for the body and the number of sheets change after the backstrip part is determined, the backstrip print position is automatically calculated again unless the backstrip greatly changes. The shortage of the manuscript width, overflow, and misalignment can be prevented.

In this fashion, the present invention can easily implement work associated with case binding without placing on the user the burden to finely set the backstrip width every printed material. The present invention can provide a good-looking case-bound product.

In particular, the folding position of the backstrip is set to one side (on the front or back cover side of the backstrip) of the backstrip as a fixed position (fixed layout position (reference position)). Then, print data generated by performing an imposition process for a case binding cover (front cover, backstrip, and back cover) so as to fold the cover along the set side as a reference.

Consequently, the case binding cover on which the layouts or colors of the front cover (or back cover) and backstrip are consecutive can be easily obtained.

More specifically, according to the present invention, the fixed layout position of the backstrip is selected from the front cover side of the backstrip, its back cover side, its center, and an arbitrary position. A print position calculation process corresponding to the selected position is executed, and a print job is generated from the calculation result. (Since the folding position on the device side is fixed, a print position calculation process corresponding to the selected fixed layout position is executed.)

When the manuscript page is divided into the front cover, backstrip, and back cover, the reference position of the backstrip after division is set, and print data is generated by performing (the print position calculation process) for, as the backstrip, data of the backstrip width calculated from the set reference position.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-235495, filed Aug. 15, 2005, which is hereby incorporated by reference herein in its entirety.

What is claimed is:

1. An information processing apparatus which decides a print position of manuscript page data for a cover that is to be printed on a print sheet for the cover, comprising:

a first setting unit adapted to set a position where object for a backstrip is printed on a backstrip of the cover;

a second setting unit adapted to set a reference position in the manuscript page data for the cover;

a deciding unit adapted to decide a print position where the manuscript page data is printed on the print sheet for the cover so as to make the position set by said first setting unit coincide with the reference position set by said second setting unit with each other; and an output unit for, when a difference between the print position decided by said deciding unit and a print position obtained from document information on the manuscript page data is not less than a predetermined value, outputting warning information announcing that the difference is not less than the predetermined value.

2. A computer-readable storage medium storing a program for causing a computer to control an information processing apparatus which decides a print position of manuscript page data for a cover that is to be printed on a print sheet for the cover, causing the computer to execute a first setting step of setting a position where object for a backstrip is printed on a backstrip of the cover;

a second setting step of setting a reference position in the manuscript page data for the cover;

a deciding step of deciding a print position where the manuscript page data is printed on the print sheet for the cover so as to make the position set in said first setting step coincide with the reference position set in said second setting step with each other; and an output step for, when a difference between the print position decided by said deciding step and a print position obtained from document information on the manuscript page data is not less than a predetermined value, outputting warning information announcing that the difference is not less than the predetermined value.

* * * * *